(12) United States Patent
Einav et al.

(10) Patent No.: US 10,065,799 B2
(45) Date of Patent: Sep. 4, 2018

(54) SYSTEMS AND METHODS FOR MODULAR STORAGE AND MANAGEMENT

(71) Applicant: CAJA ELASTIC DYNAMIC SOLUTIONS LTD., Binyamina, Givat Ada (IL)

(72) Inventors: Omer Einav, Kfar Monash (IL); Guy Glass, Binyamina (IL); Haim Einav, Kfar Monash (IL)

(73) Assignee: Caja Elastic Dynamic Solutions Ltd., Binyamina, Givat Ada (IL)

( * ) Notice: Subject to any disclaimer, the term of this patent is extended or adjusted under 35 U.S.C. 154(b) by 0 days.

(21) Appl. No.: 15/318,082

(22) PCT Filed: Jun. 11, 2015

(86) PCT No.: PCT/IL2015/050593
§ 371 (c)(1),
(2) Date: Dec. 12, 2016

(87) PCT Pub. No.: WO2015/189849
PCT Pub. Date: Dec. 17, 2015

(65) Prior Publication Data
US 2017/0121114 A1    May 4, 2017

Related U.S. Application Data

(60) Provisional application No. 62/011,583, filed on Jun. 13, 2014.

(51) Int. Cl.
*B65G 1/137* (2006.01)
*B65G 21/02* (2006.01)
(Continued)

(52) U.S. Cl.
CPC ....... *B65G 1/1373* (2013.01); *B65D 21/0201* (2013.01); *B65D 21/0209* (2013.01);
(Continued)

(58) Field of Classification Search
CPC .............. B65G 1/1373; B65D 21/0201; B65D 21/0209; B65D 21/0235
See application file for complete search history.

(56) References Cited

U.S. PATENT DOCUMENTS 3,468,591 A     9/1969  Wodli
9,465,390 B2 *  10/2016 Mason ................. G05D 1/0246
(Continued)

FOREIGN PATENT DOCUMENTS

WO    WO 2013/167907 A1    11/2013

OTHER PUBLICATIONS

International Search Report for International Application No. PCT/IL2015/050593 dated Oct. 18, 2015 (English Language).

*Primary Examiner* — Kaitlin S Joerger
(74) *Attorney, Agent, or Firm* — Muncy, Geissler, Olds & Lowe, P.C.

(57) ABSTRACT

Systems and methods for a modular warehouse system comprising: at least two modular stackable bins wherein said bins does not require structural support and may allow retrieval of at least one of said bins, regardless of its location in the pile, without changing said pile's order; at least two bin retrieval robots; at least one non-transitory computer-readable medium storing processor executable instructions on a computing device for warehouse management.

18 Claims, 25 Drawing Sheets

(51) Int. Cl.
   *B65D 21/02*   (2006.01)
   *B65G 1/06*    (2006.01)
   *B65G 61/00*   (2006.01)

(52) U.S. Cl.
   CPC ......... *B65D 21/0235* (2013.01); *B65G 1/065* (2013.01); *B65G 61/00* (2013.01)

(56) References Cited

U.S. PATENT DOCUMENTS

| | | | |
|---|---|---|---|
| 9,688,472 B1 * | 6/2017 | Stubbs | B65G 1/1373 |
| 9,725,241 B2 * | 8/2017 | Swinkels | B65G 1/1373 |
| 2008/0075569 A1 | 3/2008 | Benedict et al. | |

* cited by examiner

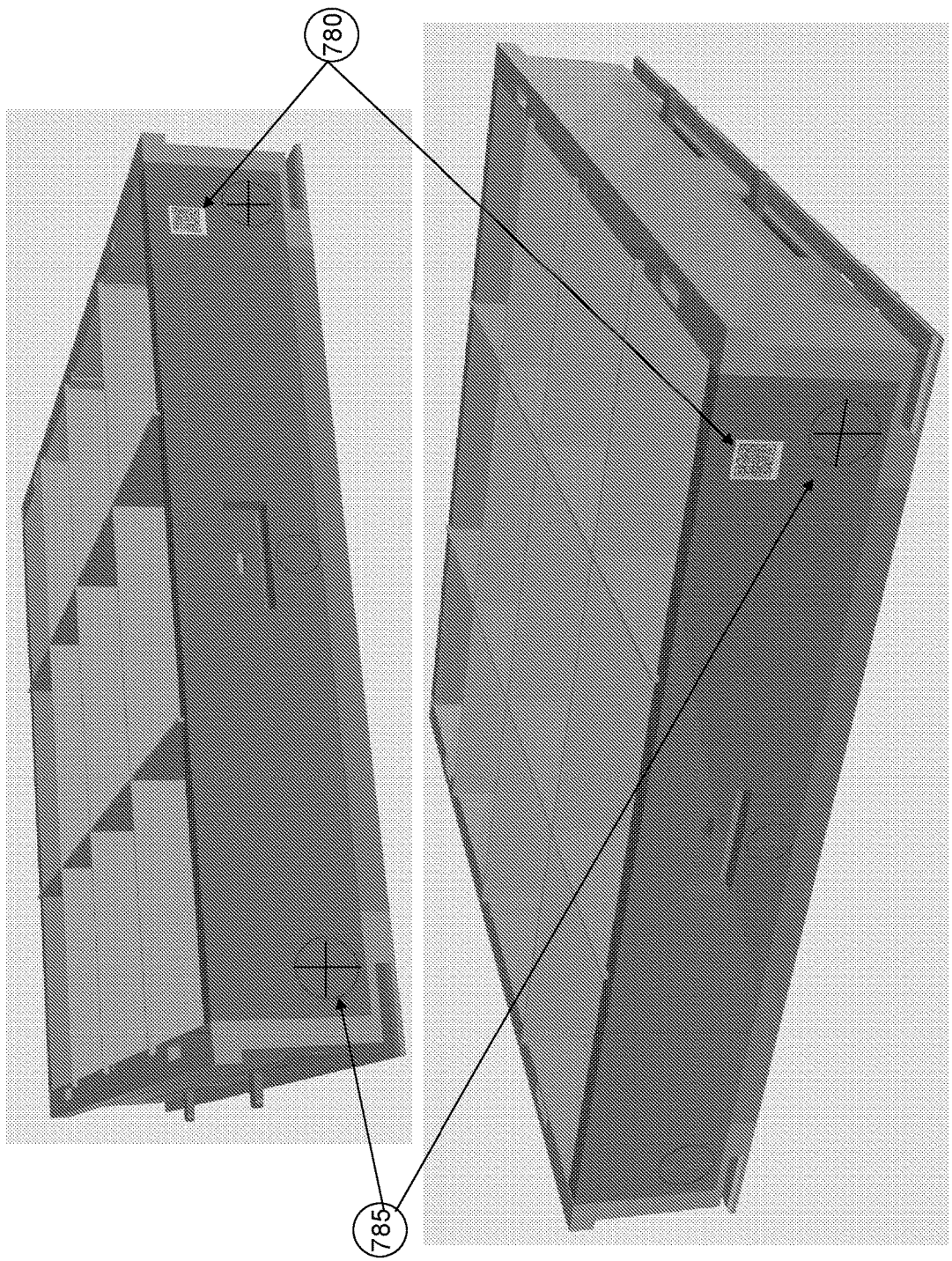

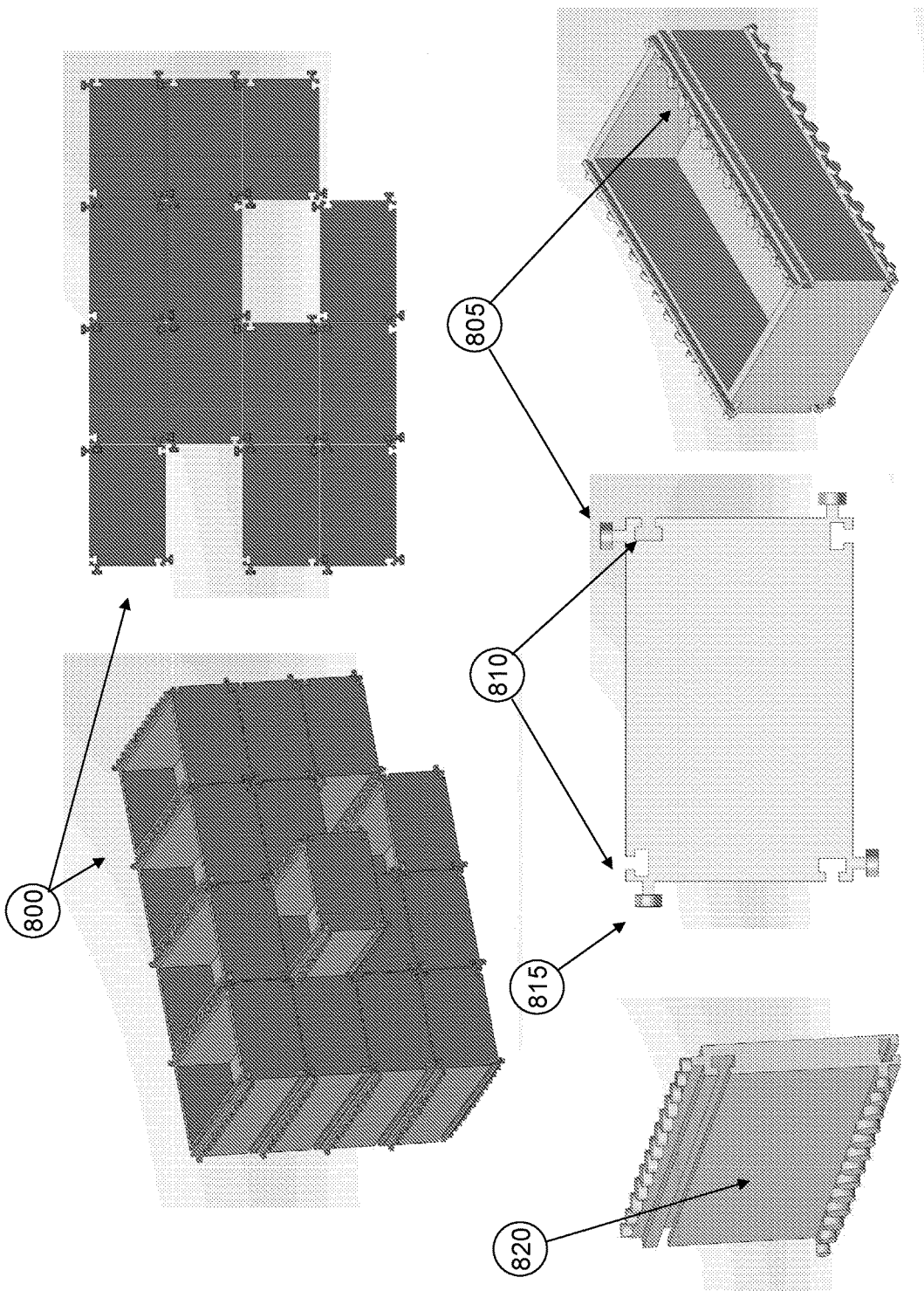

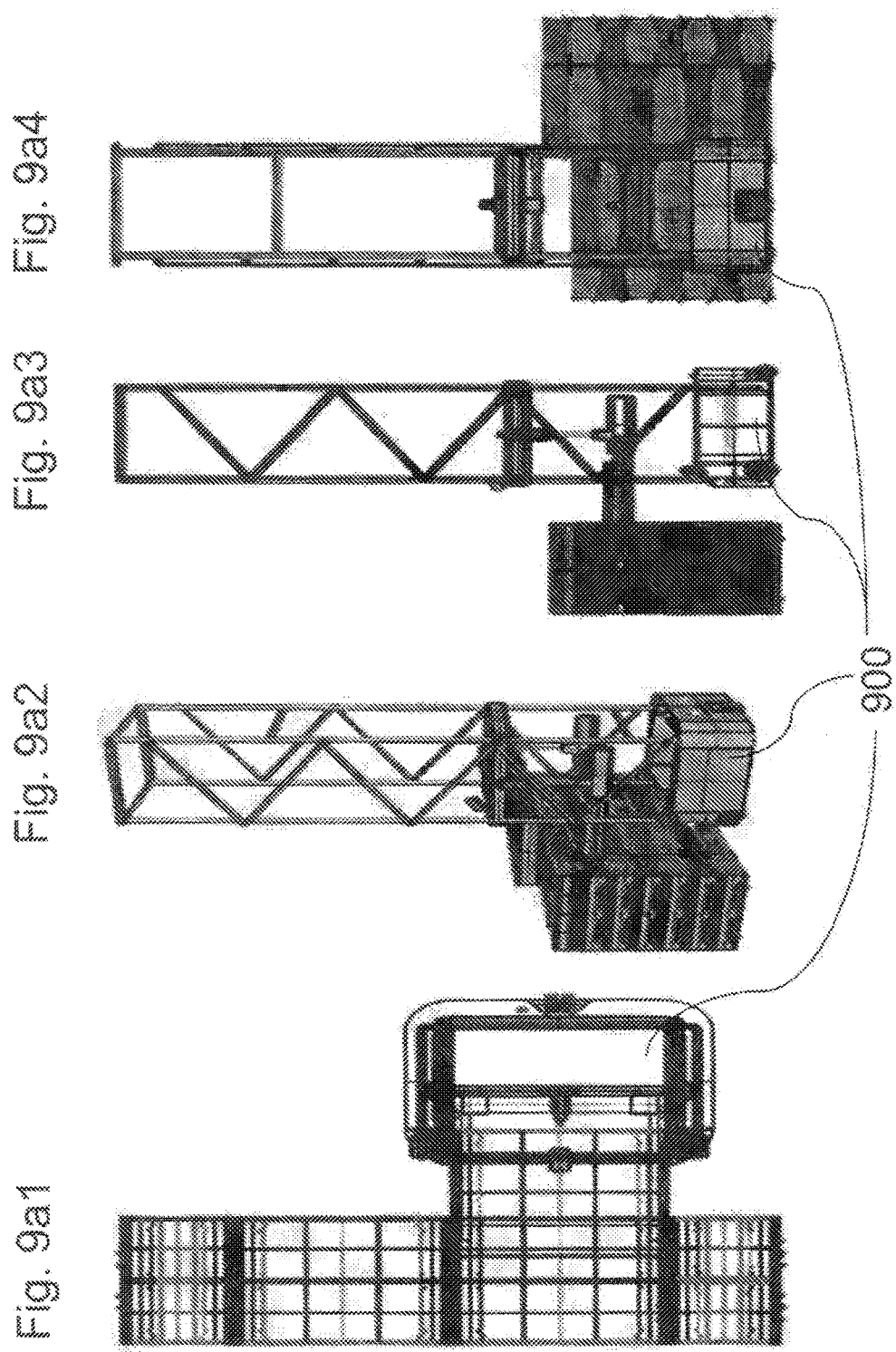

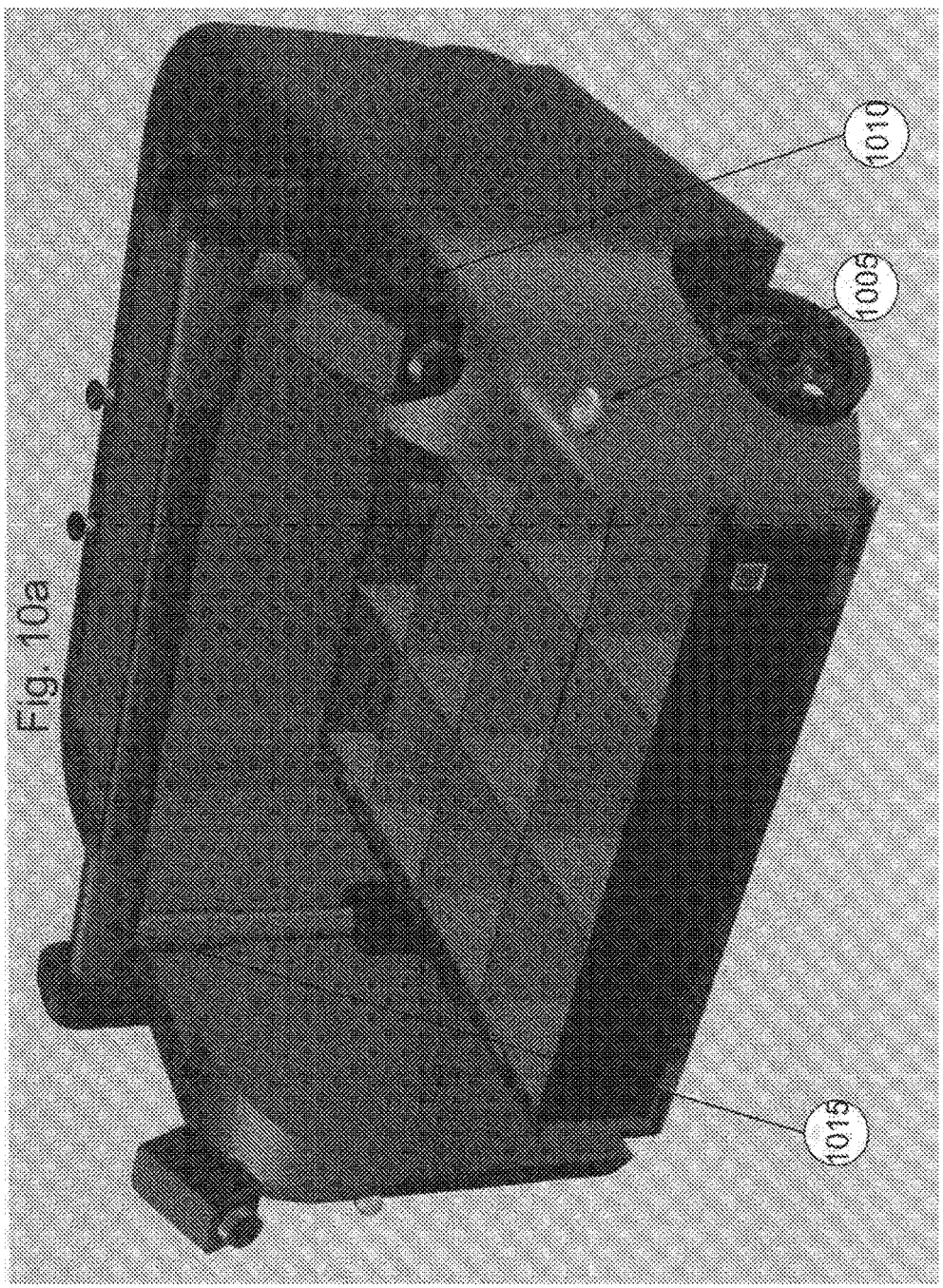

SYSTEMS AND METHODS FOR MODULAR STORAGE AND MANAGEMENT

BACKGROUND

1. Technical Field

Embodiments of the present invention relate generally to systems and methods for modular storage and management.

2. Description of Related Art

Warehouses and storage centers, for example ones that facilitate ecommerce orders, commonly use manual or semi manual processes to perform order fulfillment processes which are the activities preformed once an order is received. However, the major factors for providing high quality order fulfillment processes relates to the ability to provide flexible, redundant, scalable, Error free services as well as excellent space utilization and flexibility.

Current attempts to solve the above mentioned problems using automated order fulfillment processes are not very successful and never comprehensive. Some systems are based on operators standing in the picking area while the cases are moving and others create complex rack structures for space utilization. Some solutions utilize mobile robots to fetch cases and bins to a picking area.

Hence, an improved systems and methods as described in this application are still a long felt need.

BRIEF SUMMARY

According to an aspect of the present invention a modular warehouse system comprising: at least two modular stackable bins wherein said bins does not require structural support and may allow retrieval of at least one of said bins, regardless of its location in the pile, without changing said pile's order; at least two bin retrieval robots; at least one non-transitory computer-readable medium storing processor executable instructions on a computing device for warehouse management, adapted to: manage said warehouse inventory; manage said at least two bin retrieval robots and said at least two cars' traffic; and allow user to simulate scenarios related to said warehouse system and present said simulations results to said user via a user interface; wherein said modular warehouse does not require shelving.

It is further within provision of the invention to be further adapted to provide remote access to said instructions via data connection.

It is further within provision of the invention to be further adapted to manage orders to be prepared using items from said warehouse.

It is further within provision of the invention to be further adapted to send information to and receive information from external warehouse management system.

It is further within provision of the invention to be further adapted to send location or navigation information to subsystems.

It is further within provision of the invention to further comprise at least one lift system.

It is further within provision of the invention to further comprise at least one sorting system.

It is further within provision of the invention to further comprise at least two carts.

It is further within provision of the invention to further be wherein said at least two retrieval robots further act as carts.

It is further within provision of the invention to further comprise at least one bin retrieval robot having bin lifting abilities.

It is further within provision of the invention to further be wherein a stack of said bins comprise a gap.

It is further within provision of the invention to further be wherein said bin retrieval robot further comprise sensing abilities.

It is further within provision of the invention to further be wherein said carts further comprise sensing abilities.

It is further within provision of the invention to further be wherein said carts further adapted to perform at least one action selected from the group consisting of: pick a bin, place a bin, collect a bin from other entity, stack at least one bin on said cart and remove a bin from said cart.

It is further within provision of the invention to further comprise at least one sorting subsystem wherein said subsystem is adapted to perform at least one action selected from the group consisting of: bin to bin item handling; bin to other storing containers item handling; packing and unpacking to bins.

Another aspect of the present invention provides a method for managing a modular warehouse comprising steps of: providing storage space; providing at least two modular stackable bins wherein said bins does not require structural support and may allow retrieval of at least one of said bins, regardless of its location in the pile, without changing said pile's order; providing at least two bin retrieval robots; providing at least one non-transitory computer-readable medium storing processor executable instructions on a computing device for warehouse management, adapted to: manage said warehouse inventory; manage said at least two bin retrieval robots and said at least two cars' traffic; and allow user to simulate scenarios related to said warehouse system and present said simulations results to said user via a user interface; wherein said modular warehouse does not require shelving.

It is further within provision of the invention to be further wherein said storage space is an empty storage space.

T It is further within provision of the invention to be further wherein said storage space is previously storage space comprising shelves or other structural storing structures, further comprising steps of providing said instructions with a map of said current storage space.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

In order to understand the invention and to see how it may be implemented in practice, a plurality of embodiments will now be described, by way of non-limiting example only, with reference to the accompanying drawings, in which:

FIG. 7e illustrates an embodiment of storage units of the present invention;

FIG. 8a illustrates an embodiment of storage units and mechanisms of the present invention;

FIGS. 9a1-9a4 illustrate the components of a lift subsystem of an embodiment of the present invention;

FIG. 10a illustrates the components of a delivery subsystem of an embodiment of the present invention;

DETAILED DESCRIPTION

Figure 1:
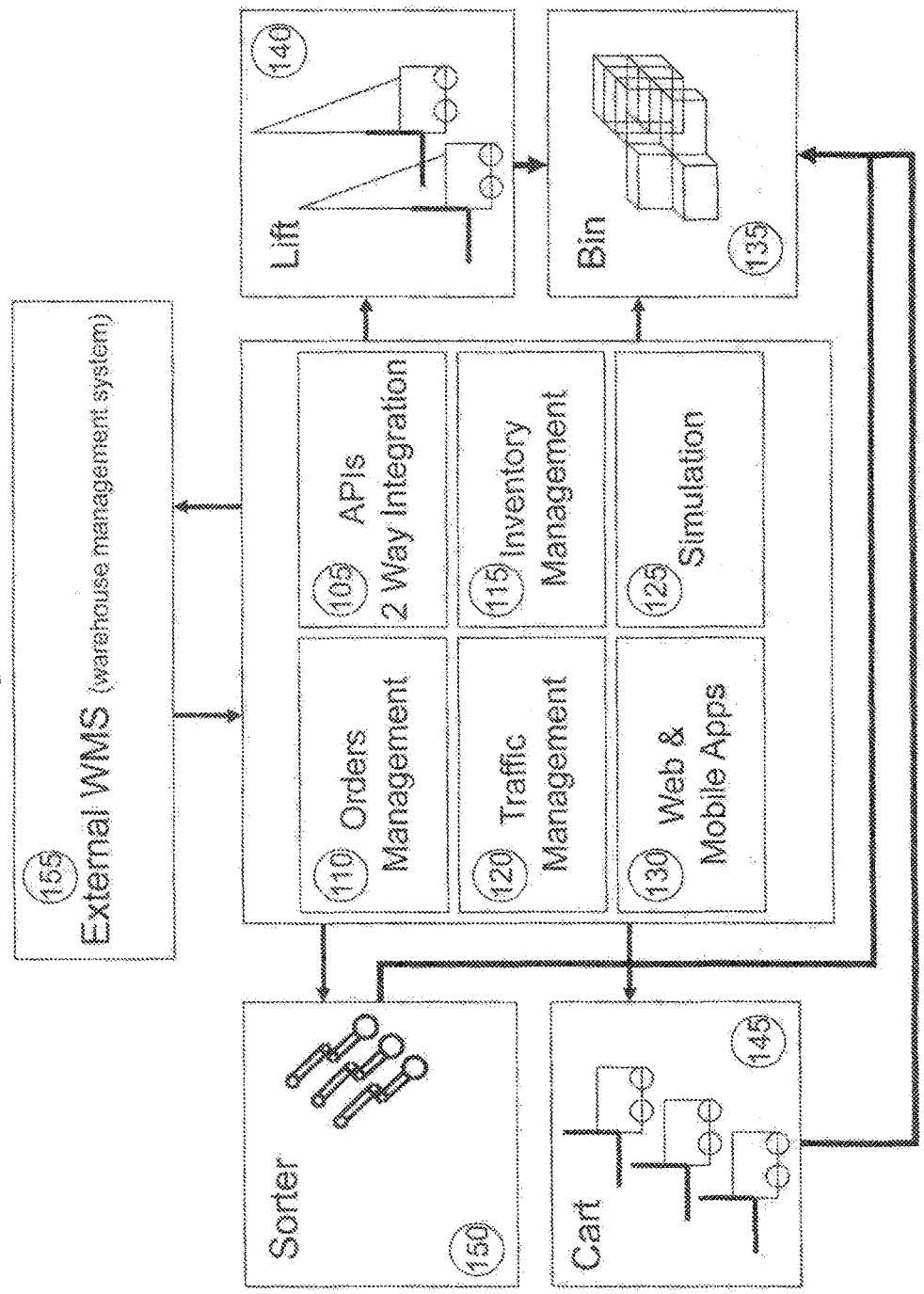
FIG. 1 illustrates the components of an embodiment of the present invention.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for modular storage and management.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder. And ultimately when the features manifest, so an entirely new feature be recalled. Reference throughout this specification to "one embodiment" or "an embodiment" means that a particular feature, structure, or characteristic described in connection with the embodiment is included in at least one embodiment of the invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term 'plurality' refers hereinafter to any positive integer (e.g, 1,5, or 10).

The term 'robot' refers hereinafter to any mechanical or electro-mechanical agent that is guided by a computer program, electronic circuitry or remote controlled.

The invention relates to systems and methods for modular storage and management of warehouses and storage centers, for example ones that facilitate ecommerce orders.

Generally speaking, the system and method may allow the creation, management and maintenance of warehouse systems while allowing flexible configuration of the warehouse bin for optimal storage and retrieval in many parameters. A key and important aspect of the invention relates to the use of bins adapted to be stackable and orderly piled on each other, although may be of vary sizes and dimensions, while allowing retrieval of bins without changing the pile's order or stacking mode.

Such can be achieved, for example, by providing a robotic system utilized for bin retrieval and delivery while the robotic system may include multiple robot types that together optimize the warehouse and order fulfillment processes. Such robot type may include robotic lift units that can reach bins placed at various heights, robotic carts that move bins around the warehouse and robotic sorting systems that pick and place items from bins for specific customer's orders, all in a computer managed system.

One of the achievements of the invention may be a completely modular warehouse not comprising any permanent structures but merely stacks of the invention's bins, without size or height limits and while allowing the warehouse to completely reorder and rebuilt itself in real time.

In an embodiment of the invention, a warehouse may comprise various kinds and quantities of items. Those items may be arranged, automatically or manually, in bins adapted to be stackable and orderly piled on each other, although may be have vary sizes and dimensions, while allowing retrieval of bins without changing the pile's order or stacking mode. Although in some embodiments of the invention such a warehouse may not require any inside structures, for example shelves, in other embodiments the system may allow using such structures, for example in cases of warehouse conversion from a regular warehouse to the current invention's warehouse. In such cases, the bins may be stacked free standing on the floor; on shelf without any modification to the shelf; supported by walls or other supports; supported by dedicated walls; etc.

In some embodiments of the invention, the bins may be grouped in various manners such as aisles; in flexible heights; in multi rows; in varying deeps (such as 3 bins deep, 4 bins deep etc); with or without gaps, for example for allowing carts to move inside multi rows; etc.

As mentioned above, the system's bins may comprise mechanism that may allow stacking the bins using horizontal and vertical attachments means. Allowing the warehouse management software and system to create complex self supporting stacks that may allow retrieval and insertion of bins without changing the pile or bin structure order. The attachment means may allow, in some embodiments, the attachment of a specific bin to its surrounding bins or dedicated supports.

Another important aspect of the current invention may be a bin retrieval robot. Such robot may be adapted to retrieve and place bins in the stacks. The robot may be, in some embodiments, a stand-alone unit having a computing device and software or may be, as in other embodiments, a remote controlled unit receiving direct orders from a remote management system. In different embodiments, such robot may be controlled in both manners.

In some embodiments of the invention, the bin retrieval robot may take out bins; replace bins; pick a bin form a floor, shelf, other robotic units, other carts and interact with humans.

In further embodiments the robot may further comprise lift abilities and hence act as fork lift, comprise a retractable mechanism to minimize aisle space and be able to reach floor level.

In other embodiments of the invention, the robot may further comprise sensing abilities in order to allow it to find its whereabouts in the warehouse, detect other robots, items and objects, detect human presence and interact with humans and other robots or subsystems of the warehouse. In some embodiments of the invention, sensor may be adapted to allow a vision or vision-like abilities using cameras etc, as well as using any known in the art sensors that may allow it to achieve its required functionality, such as RFID sensors, barcodes reading, QR codes reading, floor marks reading, IR and laser sensors for range and location finding, compass, GPS, inter-building GPS-like systems, etc.

In some embodiments of the invention, one or more carts may be used in order to transport bins from location to location. In an embodiment of the invention, the bin retrieval robot may further act as a cart while in other embodiments of the invention the cart will receive the bin from the bin retrieval robot and perform the transportation. As in the case of the bin retrieval robot, the cart may be a stand-alone unit or remote controlled.

In some embodiments of the invention, the cart may comprise a vision or vision-like system that may allow the cart to find its location in the warehouse. The cart may be further adapted to sense similarly to the bin retrieval robot.

In some embodiments of the invention, the cart may be adapted to carry multiple bins. While in an embodiment of the invention the cart may be adapted to carry multiple bins as a stack, in other embodiments the cart may be adapted to handle each bin it carries separately.

In some embodiments of the invention, the system may be adapted to facilitate local location software which may be embedded in stand-alone units and/or in a main server that control moving units and bins locations. In some embodiment of the present invention the local location system may detect and position a robot relative to a frame of reference. In some embodiment of the invention bin may be located relative to a frame of reference. Location can be performed using various technologies, as known in the art, such as: vision system; marks on bins; floor prepositioned marks; ceiling marks; RFID tags; ultrasound and audio signals; local GPS and GPS-like systems.

In some embodiments of the invention a sorting subsystem may be deployed as part of the system. The sorting subsystem may be adapted to completely or partly sort orders using items delivered using the robots and carts to the sorting area of the warehouse system. The sorting system may be adapted to perform actions such as bin to bin item handling; bin to other storing containers item handling; packing; unpacking to bins; etc.

In further embodiments, a conveyors system may be deployed to assist one or more robotic arms, as part of the sorting subsystem.

In other embodiments of the invention, the sorting subsystem may be only partially automatic and allow humans to perform some of the required actions.

In some embodiment of the present invention a software management system may be used to manage such warehouse's activities and to interface with additional systems such as order management system, online sales platforms, etc.

In some embodiment of the invention such management system may receive order fulfillment request from the external warehouse management system or sales platform using the system's APIs or otherwise. The fulfillment request may be sent to an order management subsystem for it to prioritize the tasks. In some embodiment of the invention, a traffic management module will send the robots and carts to retrieve the relevant bins from the stocking area and bring them to the sorting and/or packing area. In some embodiment of the invention, the traffic module will calculate a path and handle robots collisions. In some embodiment of the invention when items are picked from a bin the traffic module may also be responsible to return the bins to the stocking are. The inventory module may be responsible to the stock and space optimization. In some embodiment of the invention a space optimization system may include consideration for: distance from the sorting and picking are, bin size (regarding the items size), bin high location, products demands, size, weight, structure and predicted and unpredicted sales spikes. In some embodiment of the invention the order management module may also control the sorter robot to pick items from inventory bin into customer bin. In some embodiment of the present invention the APIs module may also report back to an external WMS the current inventory and orders status. In some embodiment of the present invention a simulation module may predict the systems needs regarding to the warehouse needs. The simulation output may include: number of lifts, carts, sorters and bins (as well as bin sizes). The simulation module may also track the system in real time and reports of any problem.

In some embodiments of the invention, the system may reorganize the entire warehouse or part of it according to predicted orders in order to allow quicker handling of such orders, for example by placing frequently used items close to the sorting and packing area while considering the prevention of collision in that area or by grouping items that are usually shipped together, etc. The reorganization may be performed even in real time without interfering with the warehouse activity.

Referring now to the drawings, FIG. 1 illustrates the components of an embodiment of the present invention: Integration APIs—the APIs may be used for a two way integration. The customer WMS 155 may send all relevant information (inventory & orders) using the APIs and the APIs may be used also to update the WMS with inventory and orders status 105. Order Management Server—may hold consumer orders request such as items and special request such as priority 110. Inventory Management Server—may allow handling the inventory including: locations (3D), Capacity optimization, Aisle structure and warehouse structure 115. Traffic Management Server—may handle traffic of all entities of the system such as, the robots (see FIG. 2, 210) and carts (see FIG. 2, 205), calculate paths, anti-collisions in real time 120, etc. Simulation Server—may simulate the customer needs (number of lifts, carts, sorters and bins) based on previous transactions and inventory database and may be used for future needs such as to predict order spikes 125. Web & Mobile Apps—the apps may enable consumers to track the fulfillment process (pick & pack) in real time 130. Bins 135. Lifts 140. Carts 145. Sorter/Picker 150. External WMS (Warehouse Management System) which may represent the Warehouse Management System of the customer 155.

Figure 2:
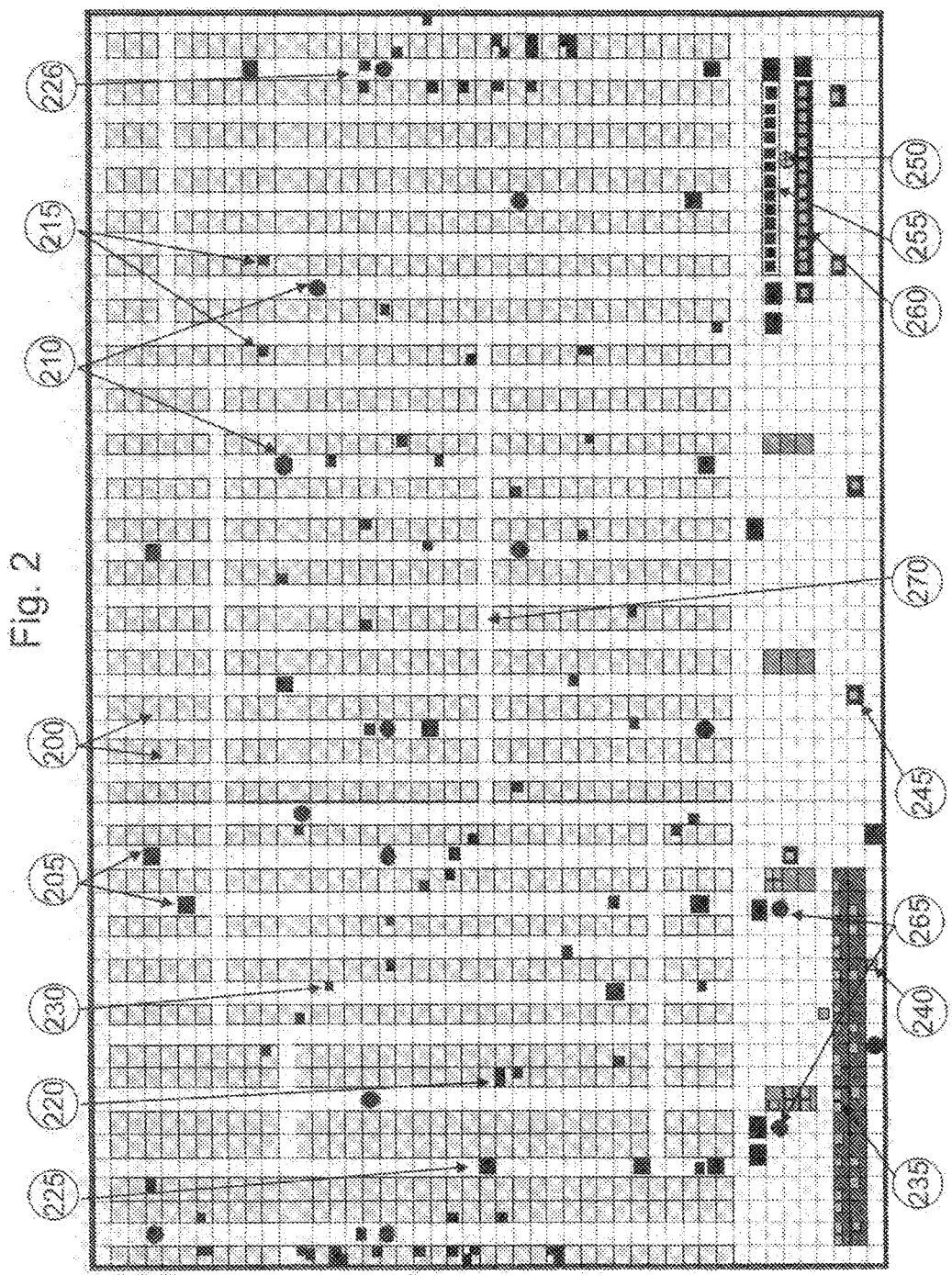
FIG. 2 illustrates the components of a warehouse of an embodiment of the present invention.

FIG. 2 illustrates the components of a warehouse of an embodiment of the present invention: Available location to place stackable bins. The location is not mandatory and can be changed by the inventory management server 200. Carts without bins, moving carts in the aisles 205. Lifts without bin, moving lifts in the aisles 210. Inventory bins stackable 215. Inventory bins with two row deep 220. Cart holding Inventory bin 225. Lift after dropping inventory bin from a stackable location 226. Inventory bin on the floor 230. Consumer order bins stackable 235. Consumer order bin on the floor 240. Cart holding Consumer order bin 245. Sorter/Picker, the sorter may be used to transfer items from the inventory bins to the consumer bins 250. Inventory bins in the picking area 255. Consumer order bin in the picking area 260. Operator in the picking station, the Operators may be used when items can't be handled by the Sorter 265. Gap for a cart to move though, as depicted in FIG. 4 270.

Figure 3:
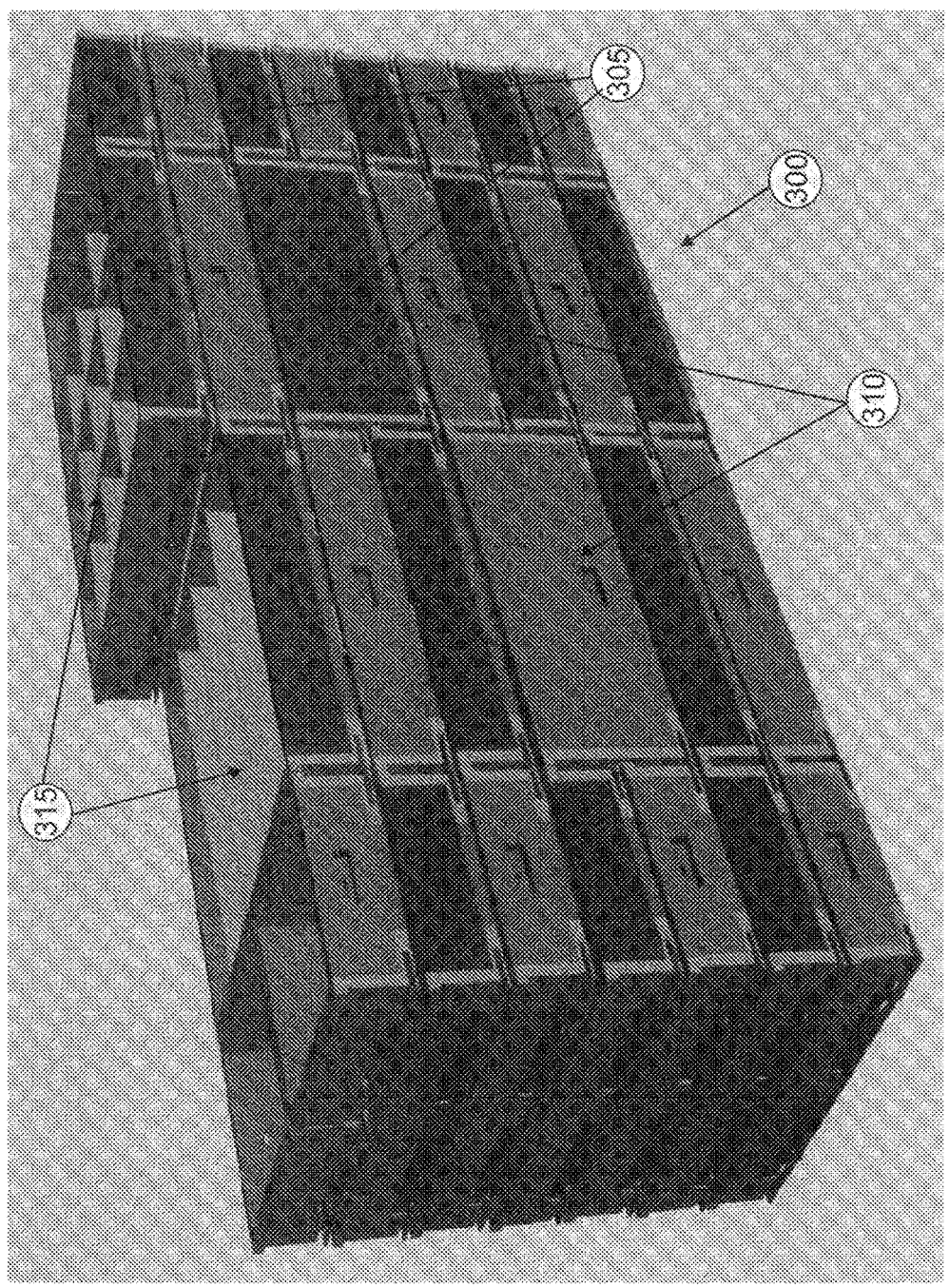
FIG. 3 illustrates an embodiment of storage units of the present invention.

FIG. 3 illustrates an embodiment of storage units of the present invention: Bins in different sizes 305, 310. Bin partitions example 315.

Figure 4:
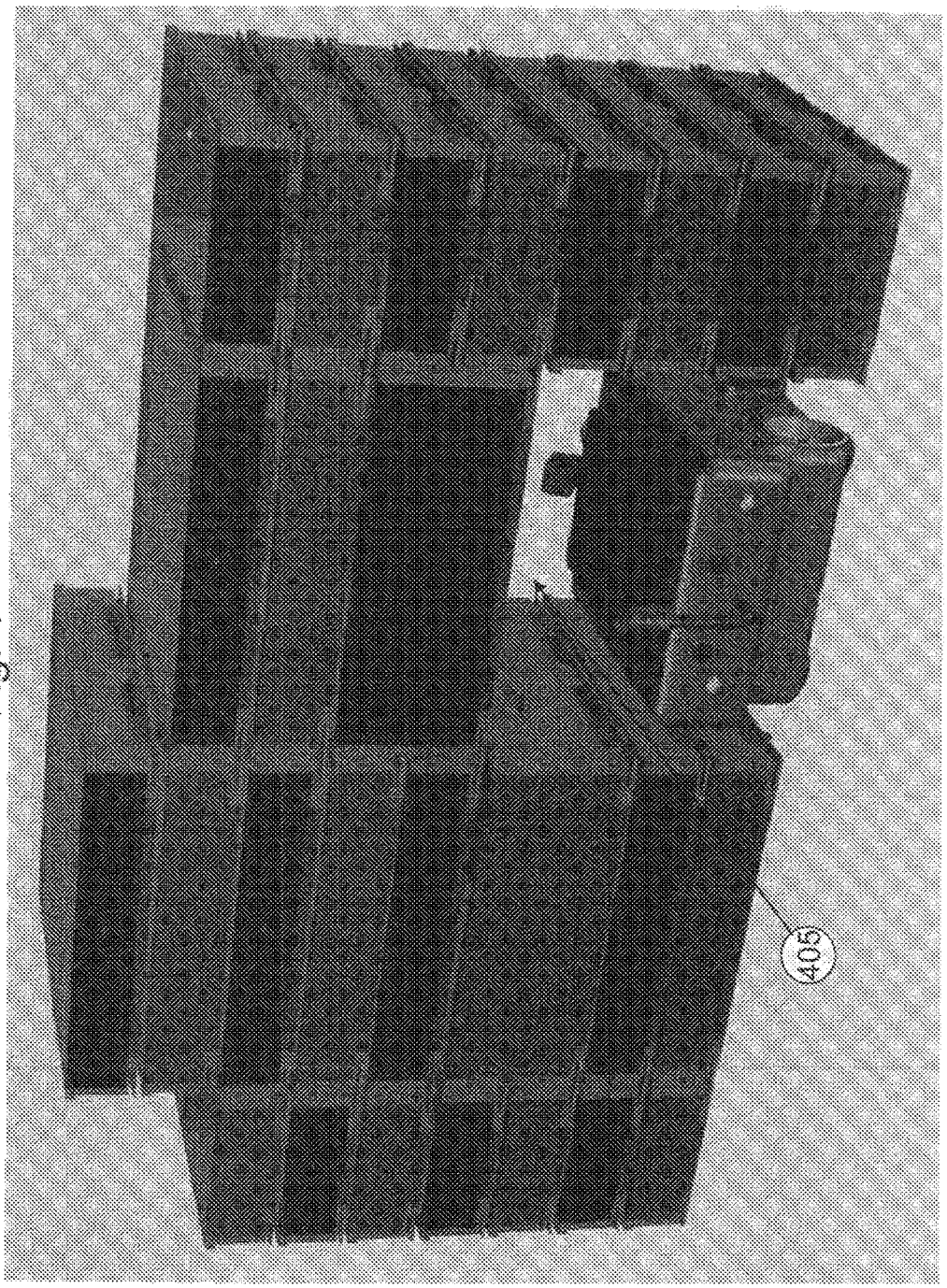
FIG. 4 illustrates an embodiment of storage units of the present invention.

FIG. 4 illustrates an embodiment of storage units of the present invention: A bin stack configuration with a gap created by the lift 900 for carts to move though 405.

Figure 5:
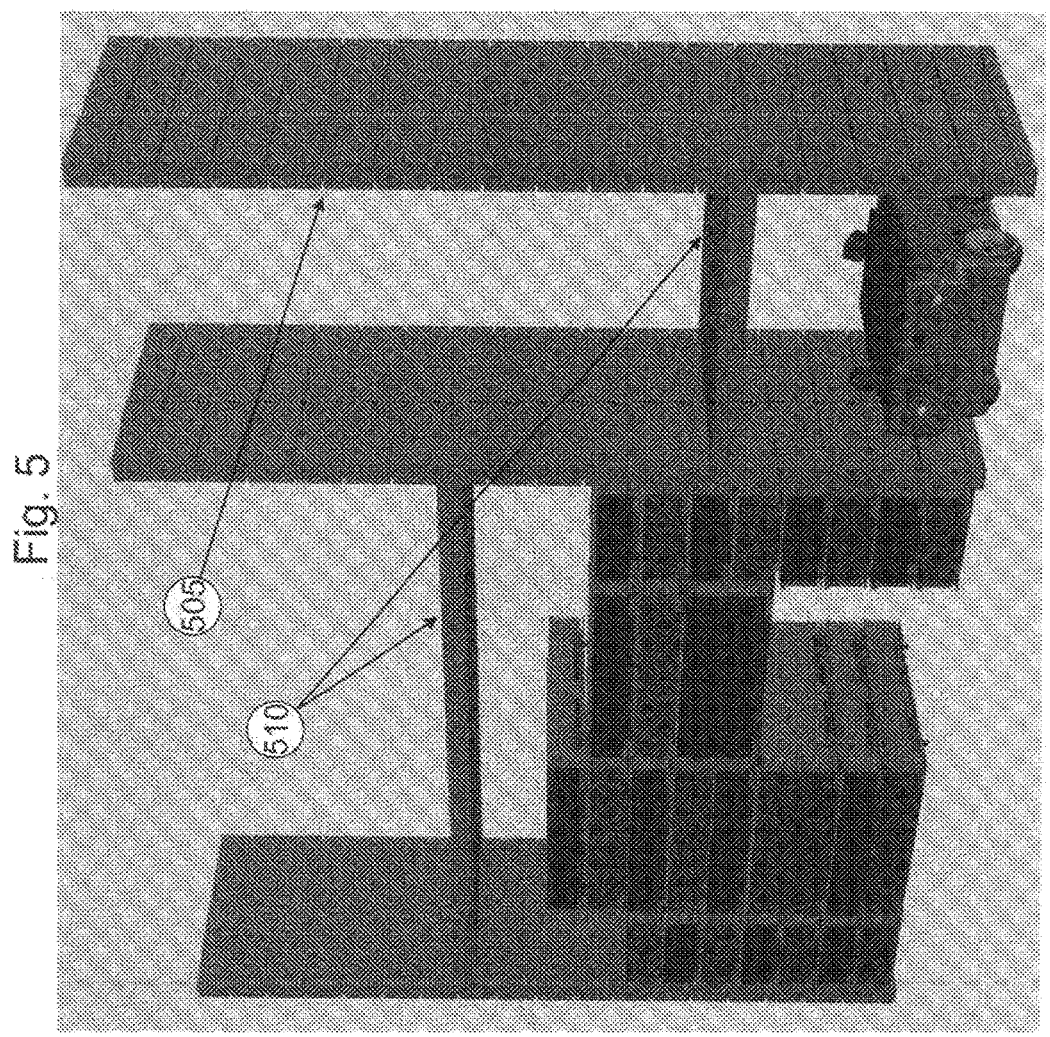
FIG. 5 illustrates an embodiment of storage units and supporting walls of the present invention.

FIG. 5 illustrates an embodiment of storage units and supporting walls of the present invention: A dedicated supporting wall 505 and supporting rack 510.

Figure 6:
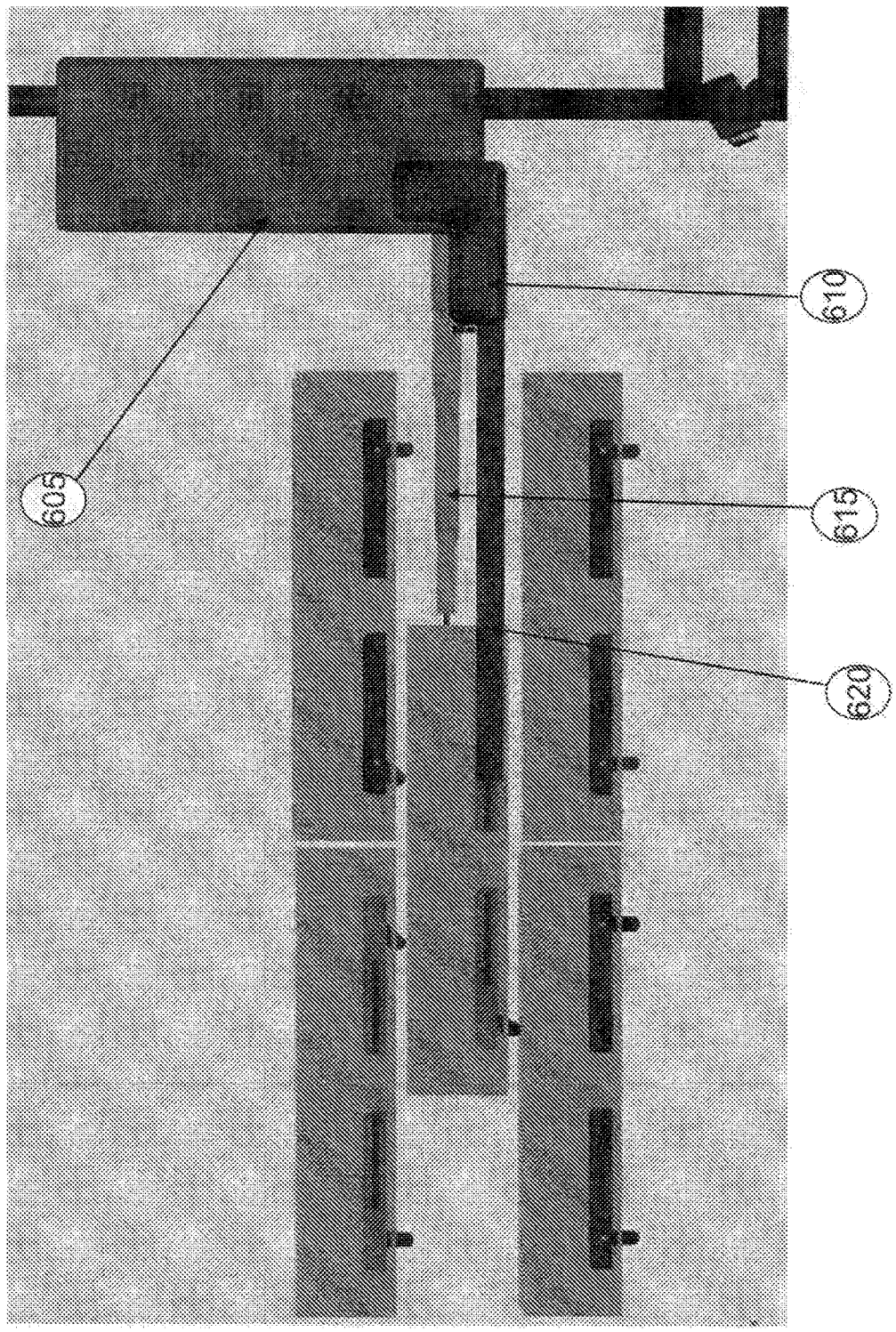
FIG. 6 illustrates an embodiment of a lift arm unit and storage units of the present invention.

FIG. 6 illustrates an embodiment of a lift arm unit and storage units of the present invention: Pushing and pulling unit 615. Lifting fork 620. Lift mechanism unit 605.

Figure 7A:
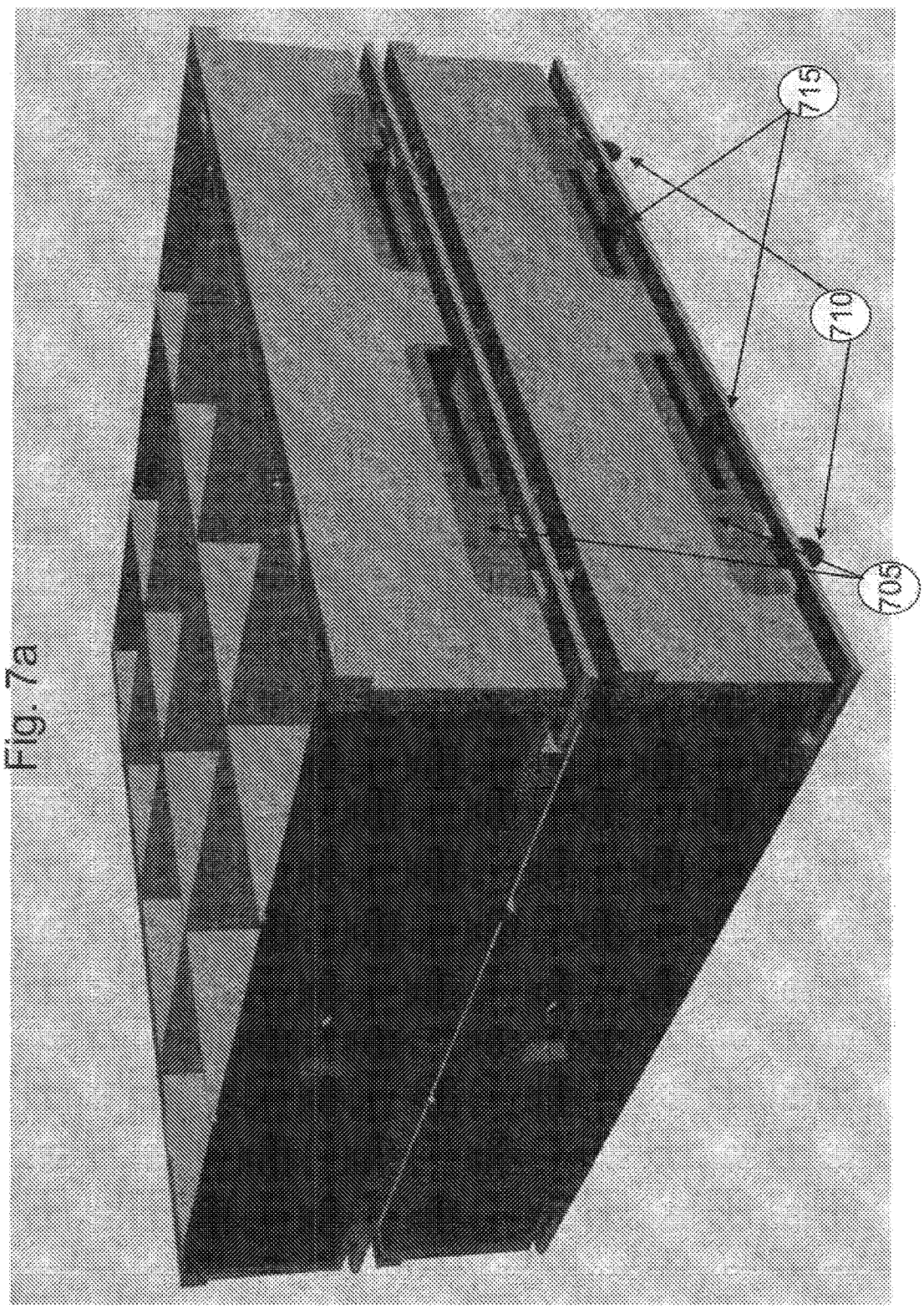
FIG. 7a illustrates an embodiment of storage units and unit's mechanism of the present invention.

FIG. 7a illustrates an embodiment of storage units and unit's mechanism of the present invention: Bin stackable mechanism 705. Vertical Pin 710. Horizontal Pin 715.

Figure 7B:
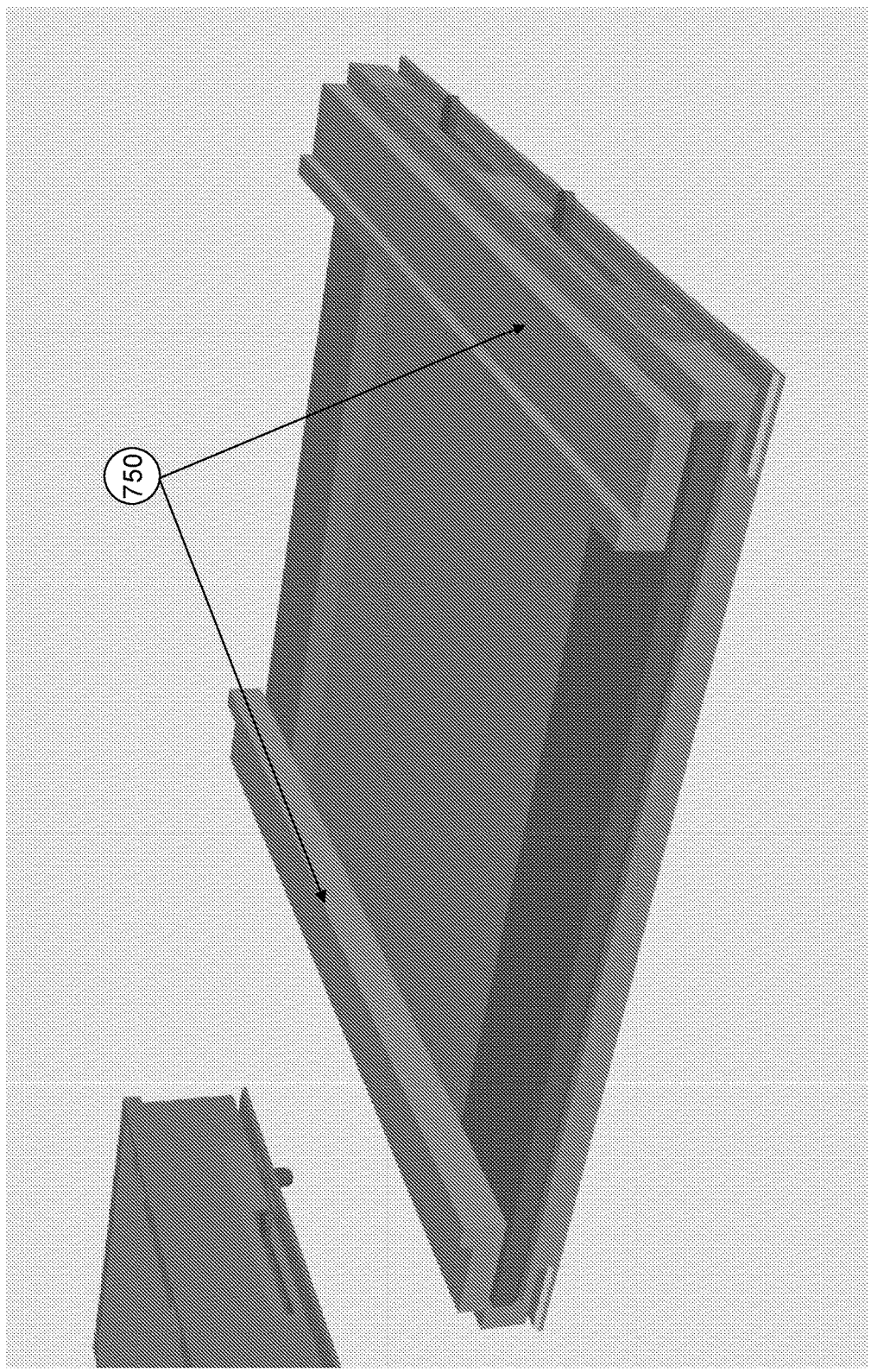
FIG. 7b illustrates an embodiment of a foldable storage unit and unit's mechanism of the present invention.

FIG. 7b illustrates an embodiment of a foldable storage unit and unit's mechanism of the present invention 750.

Figure 7C:
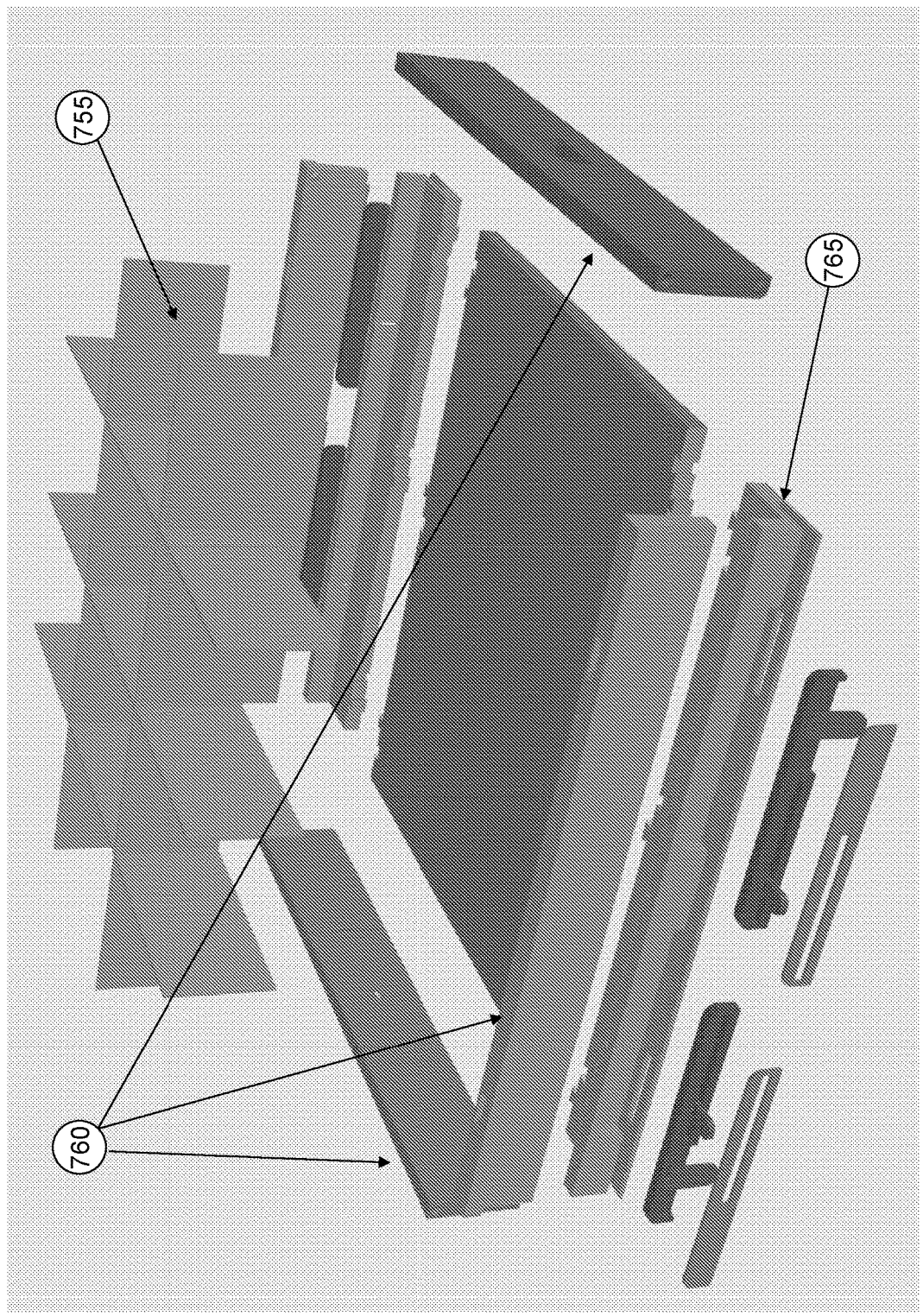
FIG. 7c illustrates an exploded view of an embodiment of a storage unit and unit's mechanism of the present invention.

FIG. 7c illustrates an exploded view of an embodiment of a storage unit and unit's mechanism of the present invention: Bin sides 760, Bin partitions 755, Bin support mechanism 765.

Figure 7D:
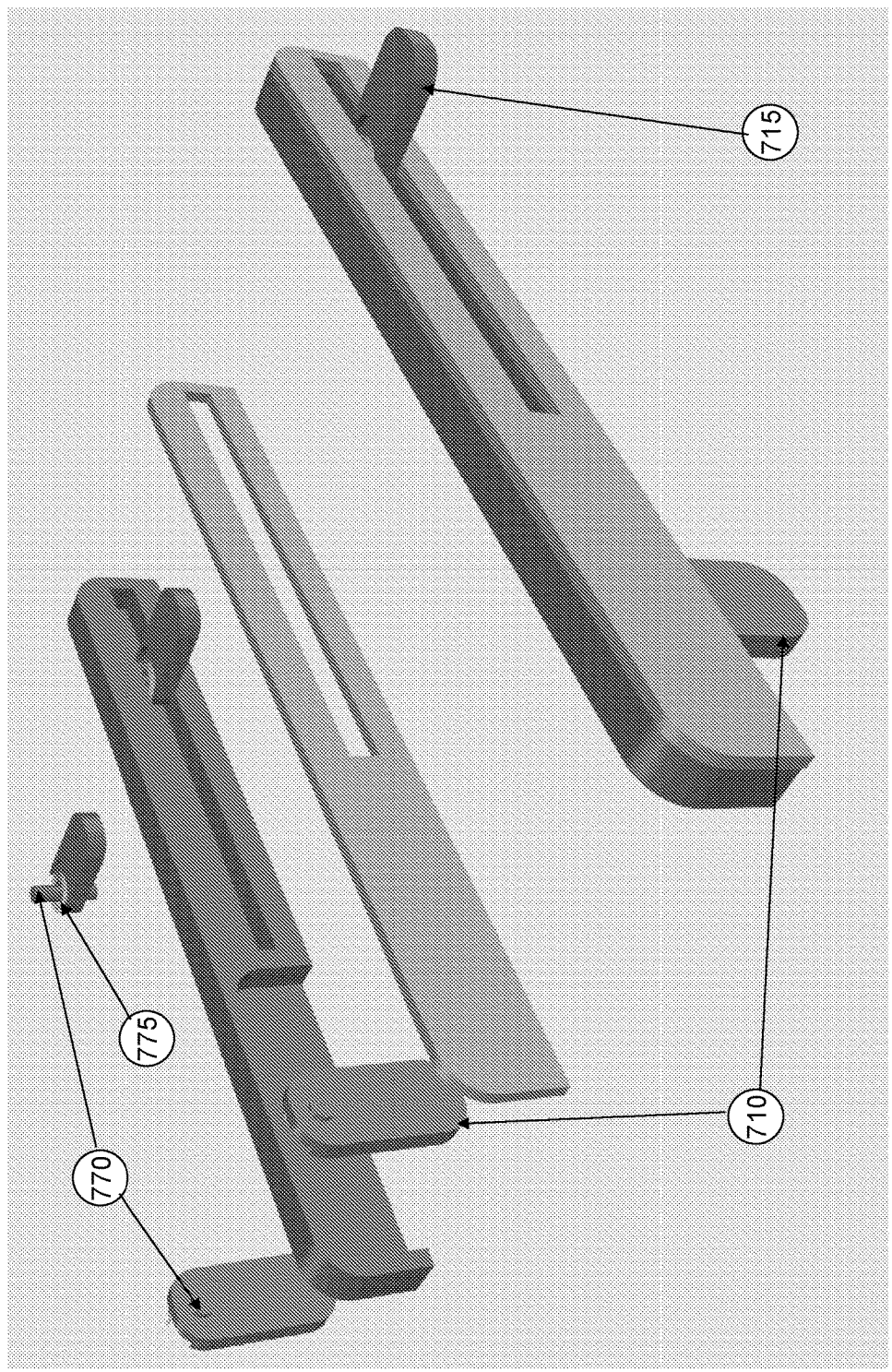
FIG. 7d illustrates an exploded view of an embodiment of a unit's mechanism of the present invention.

FIG. 7d illustrates an exploded view of an embodiment of a unit's mechanism of the present invention: Vertical pins 710, horizontal pins 715, holding pin 770, pin spring 775.

FIG. 7e illustrates an embodiment of storage units of the present invention: Unique bin QR code 780. Targets/markers 785 for allowing the robots, lifts and carts to adjustment positions.

Figure 7F:
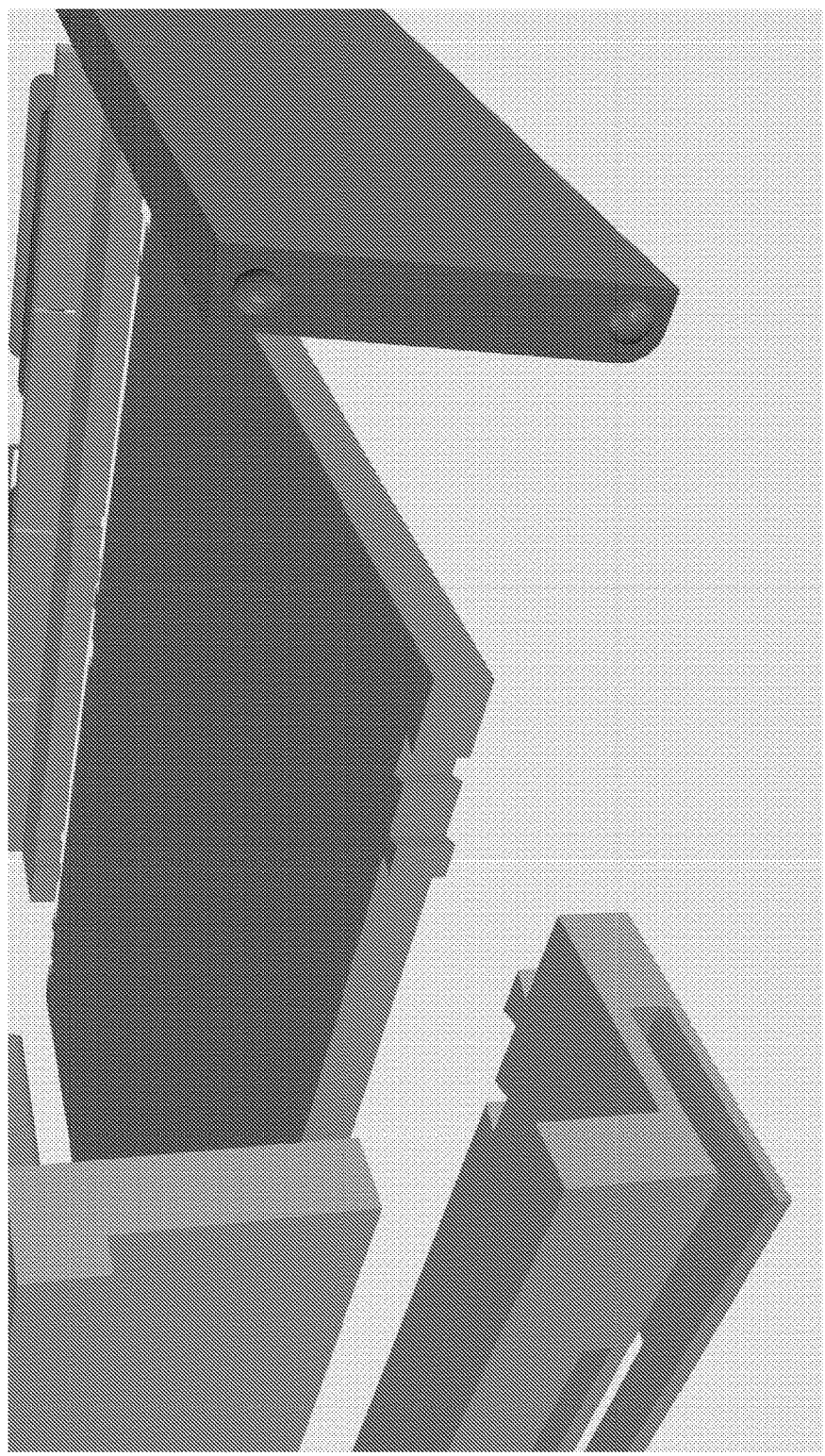
FIG. 7f illustrates an exploded view of an embodiment of a storage unit and connection mechanism of the present invention.
Figure 7G:
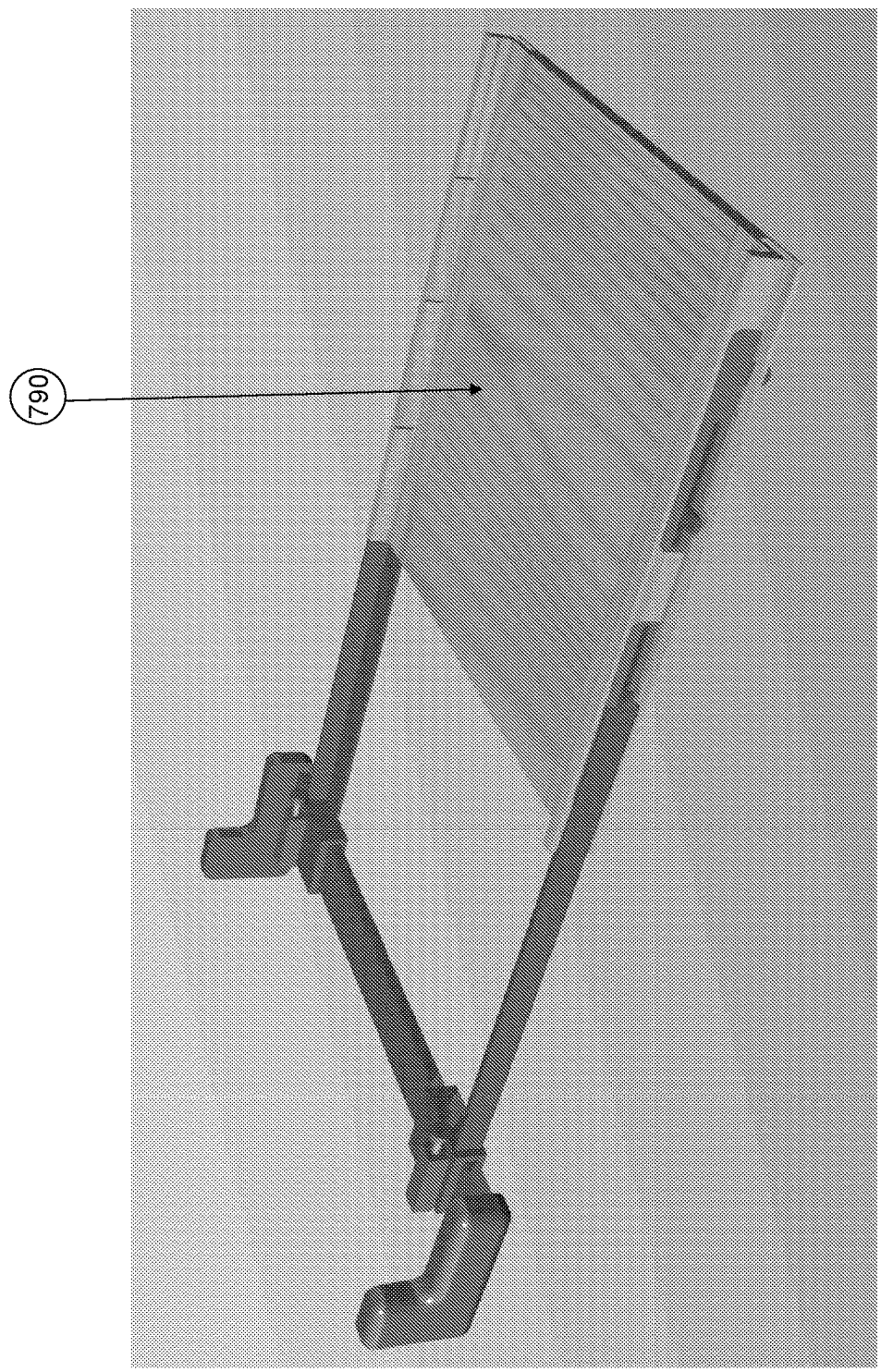
FIG. 7g illustrates an embodiment of a storage unit and mounting mechanism of the present invention.

FIG. 7f illustrates an exploded view of an embodiment of a storage unit and connection mechanism of the present invention FIG. 7g illustrates an embodiment of a storage unit and mounting mechanism of the present invention: Slide table 790

FIG. 8a illustrates an embodiment of storage units and mechanisms of the present invention: Overview of the wheeled bin system 800. Horizontal wheels with varying diameter 805 that may allow easy bin placement thru the slots 810. Vertical wheels 815. A side bin wall allowing bin constructions from modular side walls 820.

Figure 8B:
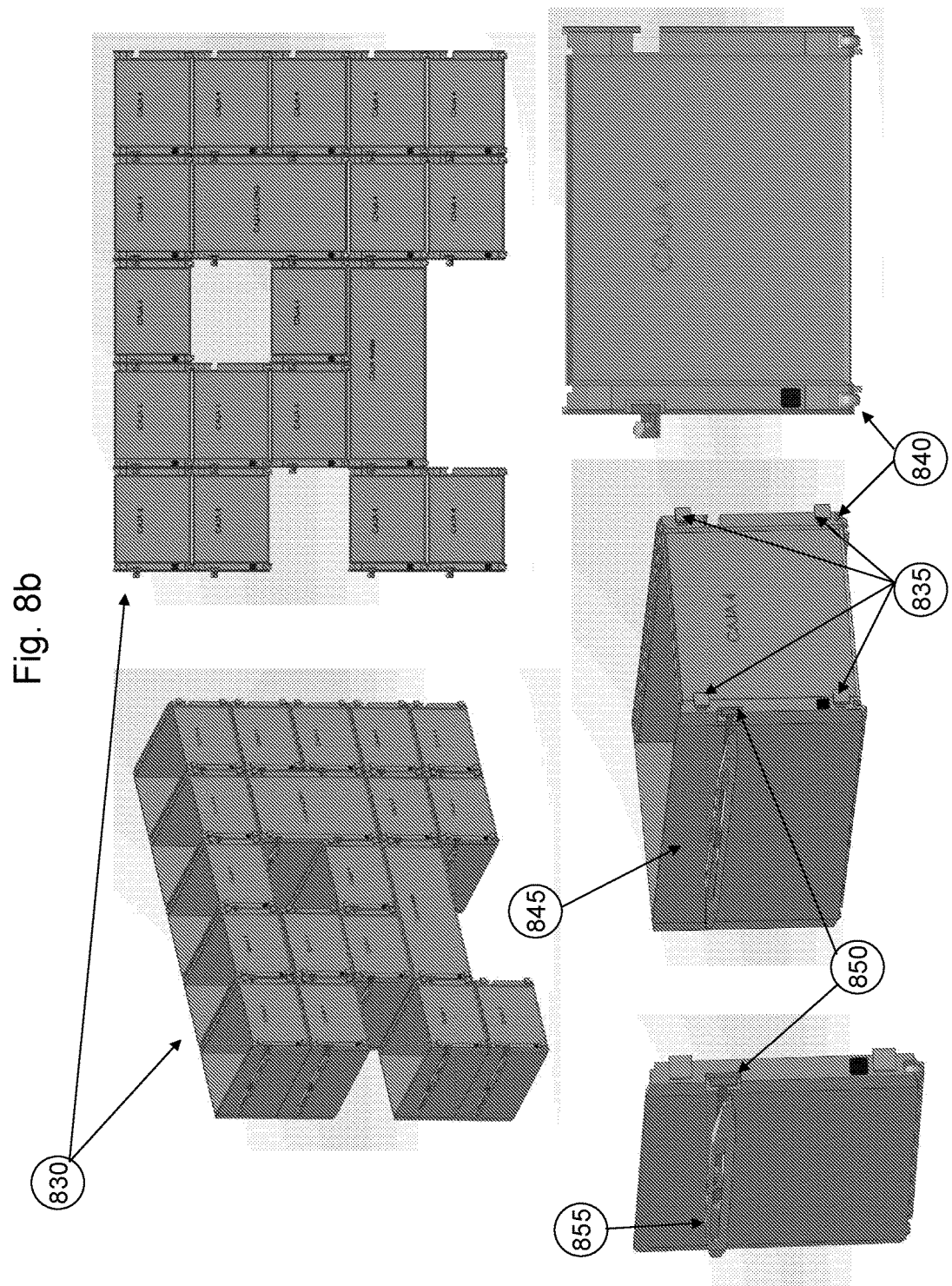
FIG. 8b illustrates an embodiment of storage units and mechanisms of the present invention.

FIG. 8b illustrates an embodiment of storage units and mechanisms of the present invention: Overview of the bin system 830. Pulling handles for bin retrieval 835. Wheels supporting the bin 840. Side expansion element 845 that may provide preload mechanism to increase bin system stability and rigidity. Expanding mechanism that may be activated by pulling a knob 850, in other embodiments the activation may be done using a rotating element (not shown). Pulling the plunger's 850 flexible unit 855 may allow expanding into the slot and may provide the necessary preload.

Figure 8C:
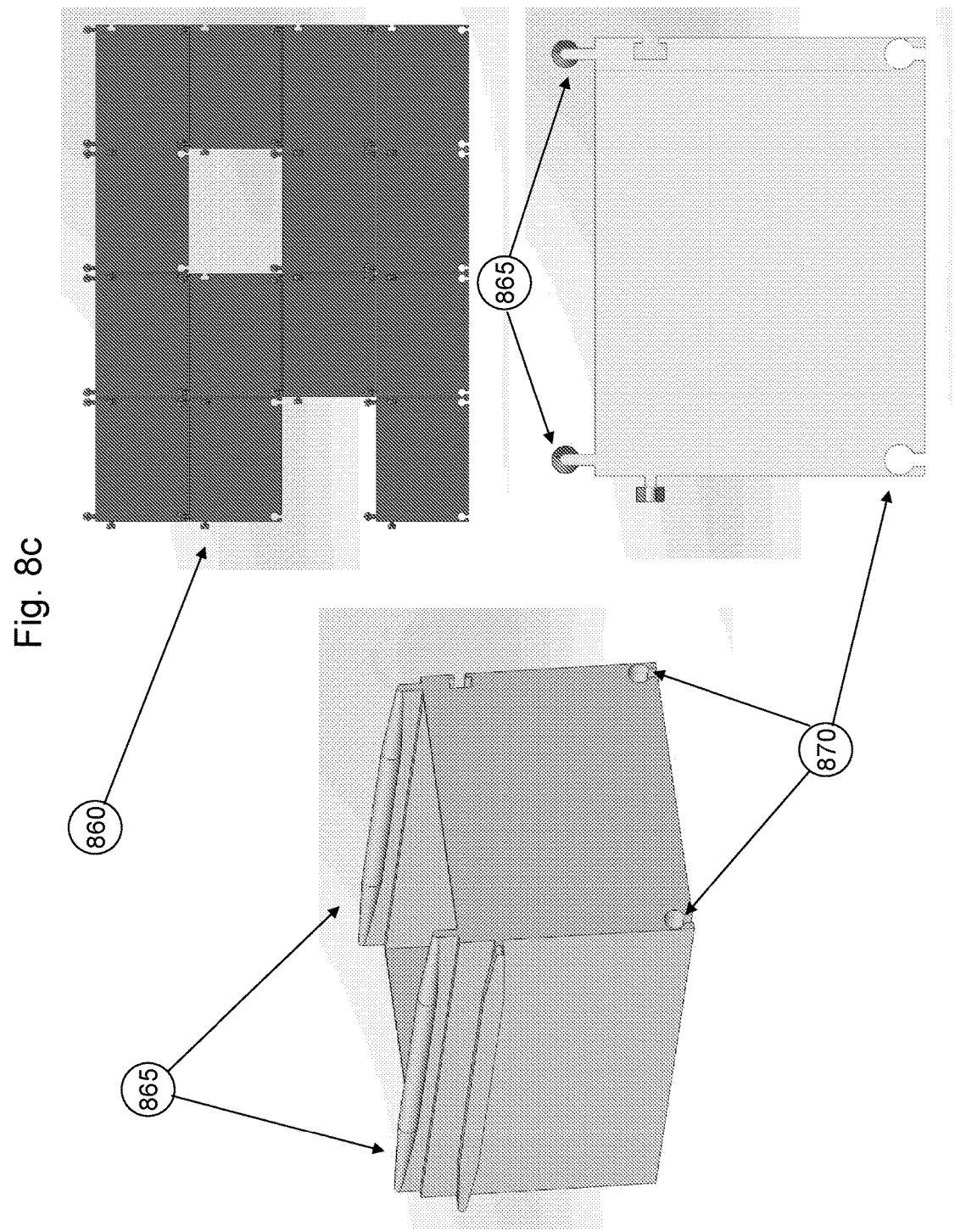
FIG. 8c illustrates an embodiment of storage units and mechanisms of the present invention.

FIG. 8c illustrates an embodiment of storage units and mechanisms of the present invention: Overview of the bin system 860 with conical rods 865. The rods may be pushed and pulled to the corresponding slots 870.

Figure 8D:
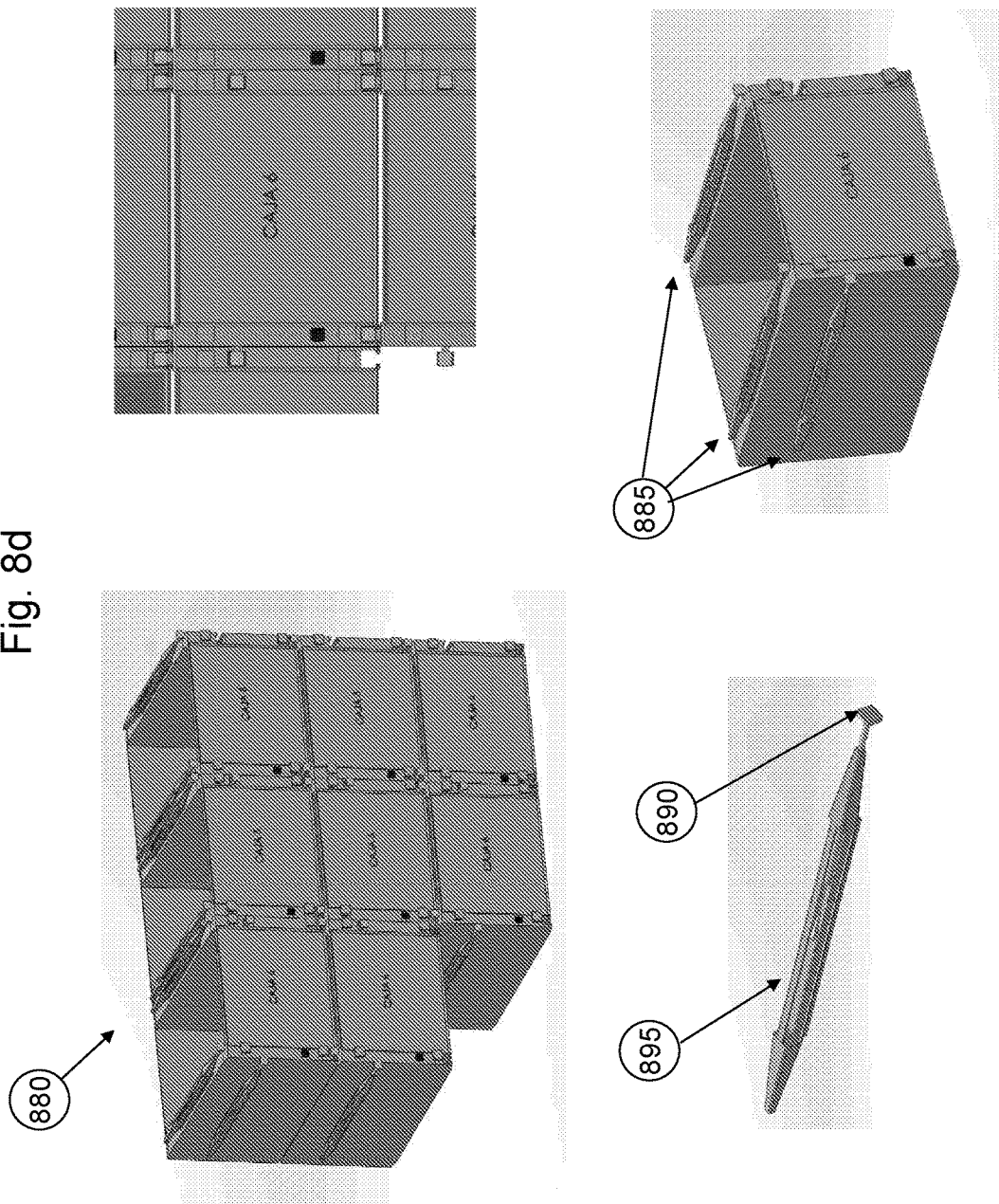
FIG. 8d illustrates an embodiment of storage units and mechanisms of the present invention.

FIG. 8d illustrates an embodiment of storage units and mechanisms of the present invention: Overview of the bin system 880. Expanding rod elements 885 that may be attached to each bin. To engage the expansion mechanism a tapered unit may be provided 890, the linear movement or rotation of the unit may expand the flexible rod element 895.

FIGS. 9a1-9a4 illustrate the components of a lift subsystem of an embodiment of the present invention 900.

Figure 9B:
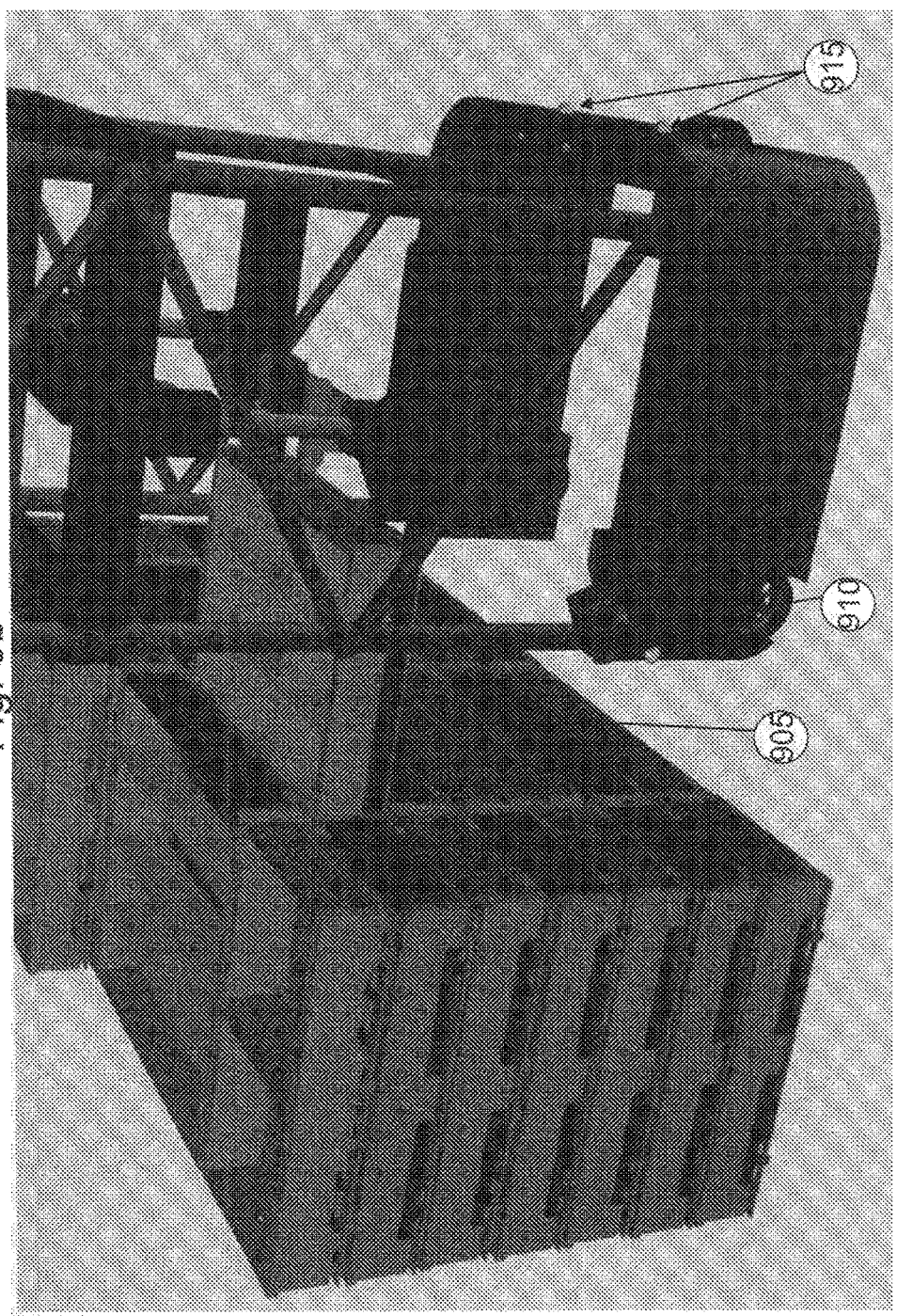
FIG. 9b illustrates the components of a lift subsystem of an embodiment of the present invention.
Figure 9C:
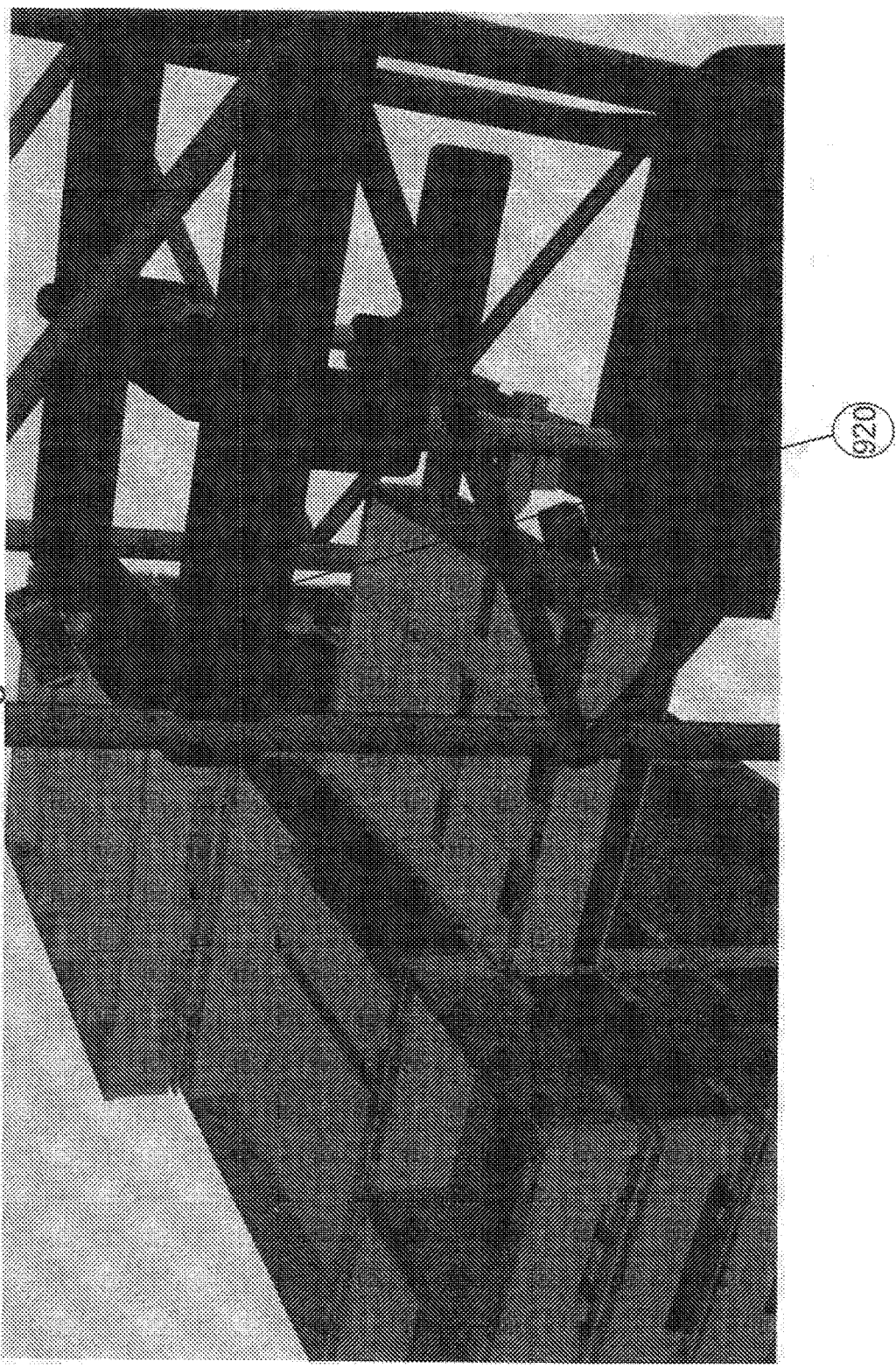
FIG. 9c illustrates the components of a lift subsystem of an embodiment of the present invention.

FIGS. 9b & 9c illustrates the components of a lift subsystem of an embodiment of the present invention: The lift may be fitted with a fork mechanism 905 that may retrieve a bin as the fork may move up and down to the bin location. In some embodiment of the invention the fork mechanism may have a tilt adjustment controlled unit that provides relative motion of the fork to the lift in order to make sure that the forks are perpendicular to the bin. The lift system may optionally be fitted with a vision system 910, FIG. 9c 920. The vision ability may allow to locate the lift relative location to the bin stack and/or to locate a specific bin. The lift system may optionally be further fitted with various sensors 915 that may provide to the lift necessary information and warnings.

Figure 10B:
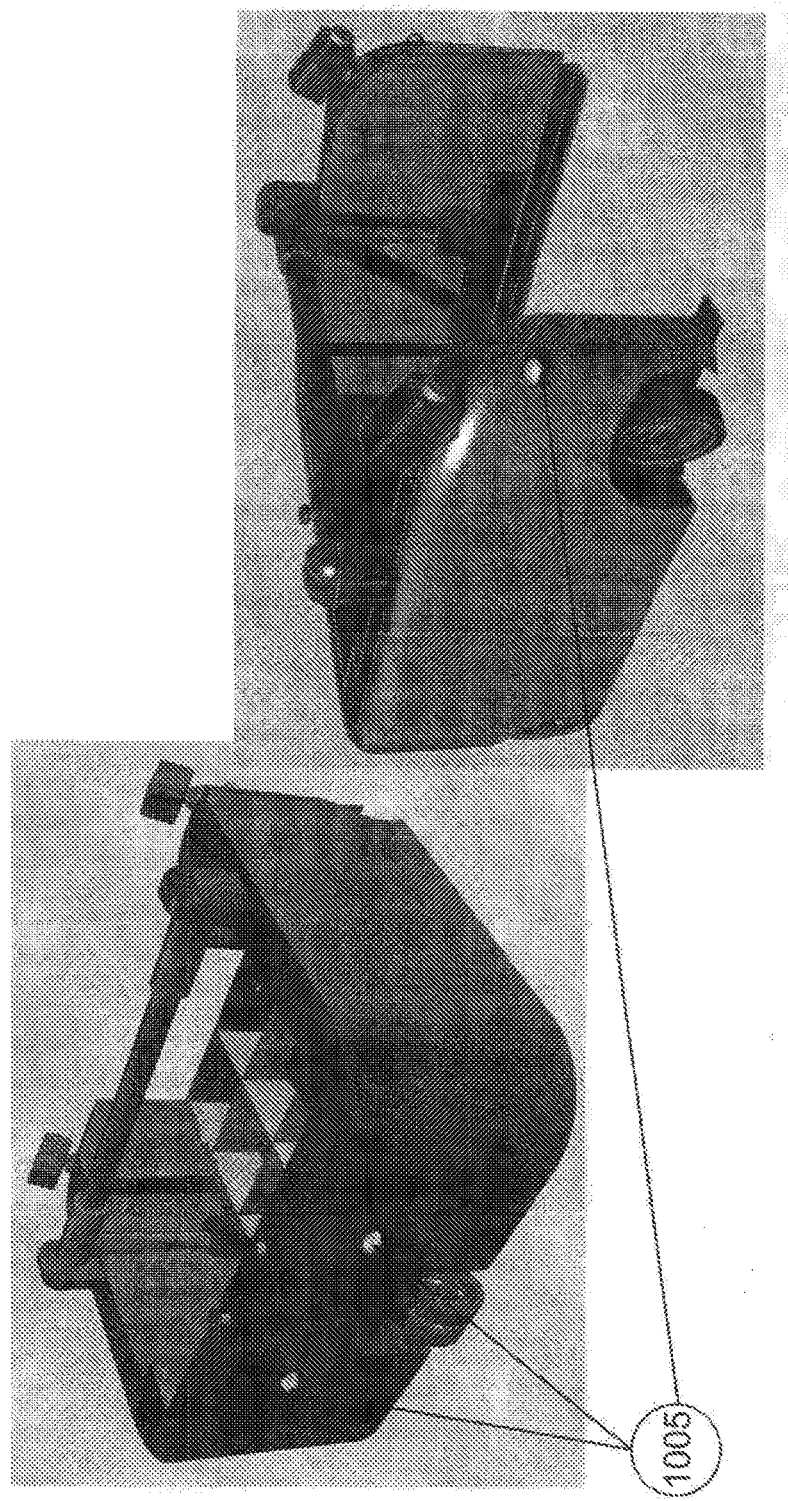
FIG. 10b illustrates the components of a delivery subsystem of an embodiment of the present invention.

FIGS. 10a and 10b illustrates the components of a delivery subsystem of an embodiment of the present invention: The cart system is optionally fitted with a vision system 1010 and other sensors 1005. The cart may be fitted with a lifting and/or gathering unit that can pick up a bin and place it where necessary 1015.

Figure 11:
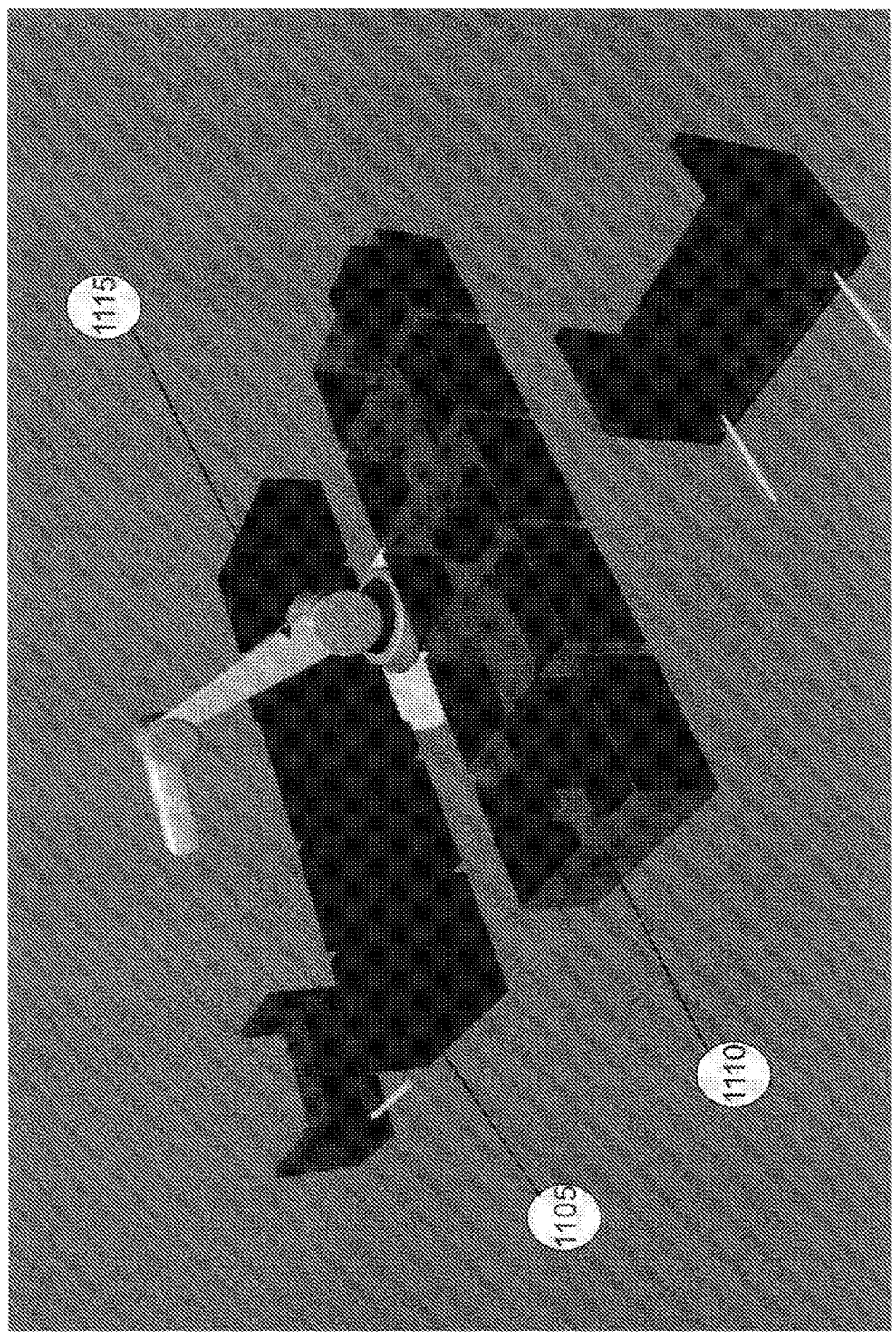
FIG. 11 illustrates the components of a sorting subsystem of an embodiment of the present invention.
Figure 12:
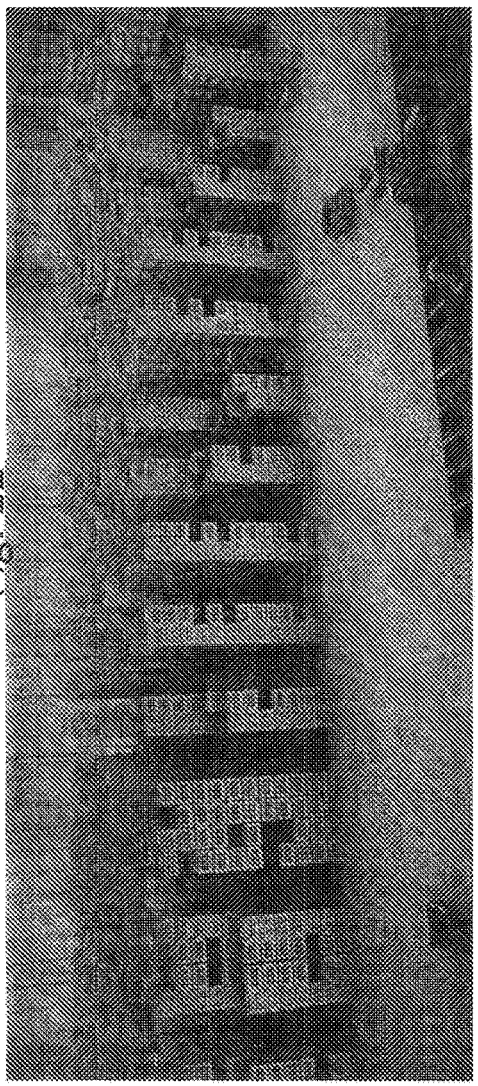
FIG. 12 illustrates an exemplary warehouse configuration of an embodiment of the present invention.
Figure 13:
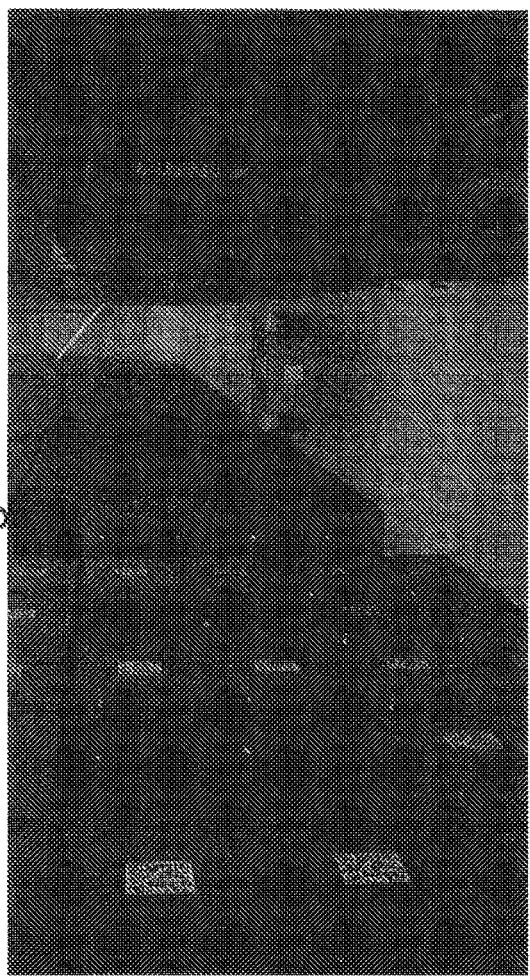
FIG. 13 illustrates an exemplary warehouse configuration of an embodiment of the present invention.
Figure 14:
FIG. 14 illustrates the components of a sorting subsystem of an embodiment of the present invention.

FIG. 11 illustrates the components of a sorting subsystem of an embodiment of the present invention: The cart system position the inventory bin 1105 in the sorting queue (in some embodiments of the invention, the bins are simply place on the ground while in other a special location or conveyor allow more sophisticated queuing). The sorting robot, picker or manipulator 1115 picks up an item from inventory bin 1105 and places it in a customer bin 1110. In some embodiment of the invention, the sorting robot, picker or manipulator can move along a desired path (e.g. linear) to take care of more bins, while in others the bins will be moved and the sorting robot, picker or manipulator will stay in one place.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A modular warehouse system comprising:
   at least two modular stackable bins wherein said bins allow retrieval of at least one of said bins, regardless of its location in the pile, without changing said pile's order, each of said bins includes top side, bottom side, right side and left side, each of the top side, bottom side, right side and left side is provided with a wheel and a slot, the slot receives the wheel of a corresponding one of the top side, bottom side, right side and left side of another one of said bins, thereby providing engagement to support said bins by each other;

at least two bin retrieval robots;

at least one non-transitory computer-readable medium storing processor executable instructions on a computing device for warehouse management, adapted to:

manage said warehouse inventory;

manage said at least two bin retrieval robots; and allow user to simulate scenarios related to said warehouse system and present said simulations results to said user via a user interface;

wherein said modular warehouse does not require shelving.

2. The modular warehouse system of claim 1 wherein said instructions further adapted to:

provide remote access to the modular warehouse system to execute said instructions via data connection.

3. The modular warehouse system of claim 1 wherein said instructions further adapted to:

manage orders to be prepared using items from said warehouse.

4. The modular warehouse system of claim 1 wherein said instructions further adapted to:

send information to and receive information from external warehouse management system.

5. The modular warehouse system of claim 1 wherein said instructions further adapted to:

send location or navigation information to subsystems.

6. The modular warehouse system of claim 1 further comprising:

at least one lift system.

7. The modular warehouse system of claim 1 further comprising:

at least one sorting system.

8. The modular warehouse system of claim 1 further comprising at least two carts.

9. The modular warehouse system of claim 1 wherein said at least two retrieval robots further act as carts.

10. The modular warehouse system of claim 1 further comprising at least one bin retrieval robot having bin lifting abilities.

11. The modular warehouse system of claim 1 wherein a stack of said bins comprise a gap.

12. The modular warehouse system of claim 1 wherein said bin retrieval robot further comprise sensing abilities.

13. The modular warehouse system of claim 8 wherein said carts further comprise sensing abilities.

14. The modular warehouse system of claim 8 wherein said carts further adapted to perform at least one action selected from the group consisting of: pick a bin, place a bin, collect a bin from other entity, stack at least one bin on said cart and remove a bin from said cart.

15. The modular warehouse system of claim 1 further comprising at least one sorting subsystem wherein said subsystem is adapted to perform at least one action selected from the group consisting of: bin to bin item handling; bin to other storing containers item handling; packing and unpacking to bins.

16. Method for managing a modular warehouse comprising steps of:

providing a storage space;

providing at least two modular stackable bins wherein allow retrieval of at least one of said bins, regardless of its location in the pile, without changing said pile's order, each of said bins includes top side, bottom side, right side and left side, each of the top side, bottom side, right side and left side is provided with a wheel and a slot, the slot receives the wheel of a corresponding one of the top side, bottom side, right side and left side of another one of said bins, thereby providing engagement to support said bins by each other;

providing at least two bin retrieval robots;

providing at least one non-transitory computer-readable medium storing processor executable instructions on a computing device for warehouse management, adapted to:

manage said warehouse inventory;

manage said at least two bin retrieval robots; and allow user to simulate scenarios related to said warehouse system and present said simulations results to said user via a user interface;

wherein said modular warehouse does not require shelving.

17. The method of claim 16 wherein said storage space is an empty storage space.

18. The method of claim 16 wherein said storage space comprises shelves or other structural storing structures, the method further comprising steps of:

providing said instructions with a map of said current storage space.

* * * * *